United States Patent
Nguyen et al.

(10) Patent No.: US 7,926,591 B2
(45) Date of Patent: Apr. 19, 2011

(54) AQUEOUS-BASED EMULSIFIED CONSOLIDATING AGENTS SUITABLE FOR USE IN DRILL-IN APPLICATIONS

(75) Inventors: Philip D. Nguyen, Duncan, OK (US);
Richard D. Rickman, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 278 days.

(21) Appl. No.: 12/319,730

(22) Filed: Jan. 12, 2009

(65) Prior Publication Data
US 2009/0151943 A1 Jun. 18, 2009

Related U.S. Application Data

(63) Continuation-in-part of application No. 11/880,230, filed on Aug. 30, 2007, which is a continuation-in-part of application No. 11/351,931, filed on Feb. 10, 2006, now Pat. No. 7,819,192.

(51) Int. Cl.
*E21B 33/13* (2006.01)
*C09K 8/03* (2006.01)
*E21B 7/00* (2006.01)

(52) U.S. Cl. .............................. 175/72; 175/65; 166/295
(58) Field of Classification Search .................. None
See application file for complete search history.

(56) References Cited

U.S. PATENT DOCUMENTS

| | | | |
|---|---|---|---|
| 2,238,671 A | 4/1941 | Woodhouse | |
| 2,604,947 A | 7/1952 | Martin et al. | |
| 2,611,750 A | 9/1952 | White et al. | |
| 2,703,316 A | 3/1955 | Schneider | |
| 2,869,642 A | 1/1959 | McKay et al. | |
| 3,047,067 A | 7/1962 | Williams et al. | |
| 3,052,298 A | 9/1962 | Malott | |
| 3,070,165 A | 12/1962 | Stratton | |
| 3,123,138 A | 3/1964 | Robichaux | |
| 3,173,484 A | 3/1965 | Huitt et al. | |
| 3,176,768 A | 4/1965 | Brandt et al. | |
| 3,195,635 A | 7/1965 | Fast | |
| 3,199,590 A | 8/1965 | Young | |
| 3,272,650 A | 9/1966 | MacVittie | |

(Continued)

FOREIGN PATENT DOCUMENTS

CA 2063877 5/2003

(Continued)

OTHER PUBLICATIONS

Examination Report for European Patent Application No. 07705152.2, dated Jul. 2, 2009.

(Continued)

*Primary Examiner* — Zakiya W Bates
*Assistant Examiner* — Angela M Ditrani
(74) *Attorney, Agent, or Firm* — Robert A. Kent; McDermott Will & Emery LLP

(57) ABSTRACT

Methods are described for drilling a wellbore through a production zone within a subterranean formation. Some of the methods use water-based consolidating emulsions that comprise an aqueous liquid and an emulsion comprising a hardening agent external phase and hardenable resin internal phase to drill along a production zone. Other methods use water-based consolidation emulsions that comprise a first emulsion comprising a hardenable resin internal phase and an aqueous external phase and a second emulsion comprising a hardening agent internal phase and an aqueous external phase to drill along a production zone.

18 Claims, 1 Drawing Sheet

U.S. PATENT DOCUMENTS

| | | | |
|---|---|---|---|
| 3,297,086 A | 1/1967 | Spain | |
| 3,302,719 A | 2/1967 | Fischer | |
| 3,308,885 A | 3/1967 | Sandiford | |
| 3,308,886 A | 3/1967 | Evans | |
| 3,310,111 A | 3/1967 | Pavlich et al. | |
| 3,316,965 A | 5/1967 | Watanabe | |
| 3,329,204 A | 7/1967 | Brieger | |
| 3,336,980 A | 8/1967 | Rike | |
| 3,364,995 A | 1/1968 | Atkins et al. | |
| 3,366,178 A | 1/1968 | Malone et al. | |
| 3,371,712 A | 3/1968 | Adams | |
| 3,373,106 A * | 3/1968 | Lister et al. | 507/103 |
| 3,375,872 A | 4/1968 | McLaughlin et al. | |
| 3,378,074 A | 4/1968 | Kiel | |
| 3,404,735 A | 10/1968 | Young et al. | |
| 3,415,320 A | 12/1968 | Young | |
| 3,455,390 A | 7/1969 | Gallus | |
| 3,478,824 A | 11/1969 | Hess et al. | |
| 3,481,403 A | 12/1969 | Gidley et al. | |
| 3,489,222 A | 1/1970 | Millhone et al. | |
| 3,492,147 A | 1/1970 | Young et al. | |
| 3,509,951 A * | 5/1970 | Enochs | 175/70 |
| 3,525,398 A | 8/1970 | Fisher | |
| 3,565,176 A | 2/1971 | Clifford | |
| 3,592,266 A | 7/1971 | Tinsley | |
| 3,659,651 A | 5/1972 | Graham | |
| 3,681,287 A | 8/1972 | Brown et al. | |
| 3,708,013 A | 1/1973 | Dismukes | |
| 3,709,298 A | 1/1973 | Pramann | |
| 3,709,641 A | 1/1973 | Sarem | |
| 3,741,308 A | 6/1973 | Veley | |
| 3,743,019 A | 7/1973 | Totty | |
| 3,754,598 A | 8/1973 | Holloway, Jr. | |
| 3,765,804 A | 10/1973 | Brandon | |
| 3,768,564 A | 10/1973 | Knox et al. | |
| 3,769,070 A | 10/1973 | Schilt | |
| 3,784,585 A | 1/1974 | Schmitt et al. | |
| 3,819,525 A | 6/1974 | Hattenbrun | |
| 3,826,310 A | 7/1974 | Karnes | |
| 3,828,854 A | 8/1974 | Templeton et al. | |
| 3,842,911 A | 10/1974 | Knox et al. | |
| 3,850,247 A | 11/1974 | Tinsley | |
| 3,854,533 A | 12/1974 | Gurley et al. | |
| 3,857,444 A | 12/1974 | Copeland | |
| 3,861,467 A | 1/1975 | Harnsberger | |
| 3,863,709 A | 2/1975 | Fitch | |
| 3,868,998 A | 3/1975 | Lybarger et al. | |
| 3,878,893 A | 4/1975 | Copeland | |
| 3,888,311 A | 6/1975 | Cooke, Jr. | |
| 3,912,692 A | 10/1975 | Casey et al. | |
| 3,933,204 A * | 1/1976 | Knapp | 166/295 |
| 3,933,205 A | 1/1976 | Kiel | |
| 3,948,672 A | 4/1976 | Harnberger | |
| 3,955,993 A | 5/1976 | Curtice | |
| 3,960,736 A | 6/1976 | Free et al. | |
| 3,976,135 A | 8/1976 | Anderson | |
| 3,977,472 A | 8/1976 | Graham et al. | |
| 4,000,781 A | 1/1977 | Knapp | |
| 4,008,763 A | 2/1977 | Lowe et al. | |
| 4,015,995 A | 4/1977 | Hess | |
| 4,018,285 A | 4/1977 | Watkins et al. | |
| 4,029,148 A | 6/1977 | Emery | |
| 4,031,958 A | 6/1977 | Sandiford et al. | |
| 4,042,032 A | 8/1977 | Anderson et al. | |
| 4,060,988 A | 12/1977 | Arnold | |
| 4,068,718 A | 1/1978 | Cooke, Jr. et al. | |
| 4,070,865 A | 1/1978 | McLaughlin | |
| 4,074,760 A | 2/1978 | Copeland et al. | |
| 4,085,801 A | 4/1978 | Sifferman et al. | |
| 4,085,802 A | 4/1978 | Sifferman et al. | |
| 4,089,437 A | 5/1978 | Chutter et al. | |
| 4,127,173 A | 11/1978 | Watkins et al. | |
| 4,169,798 A | 10/1979 | DeMartino | |
| 4,172,066 A | 10/1979 | Zweigle et al. | |
| 4,220,566 A | 9/1980 | Constien et al. | |
| 4,245,702 A | 1/1981 | Haafkens et al. | |
| 4,247,430 A | 1/1981 | Constien | |
| 4,259,205 A | 3/1981 | Murphey | |
| 4,273,187 A | 6/1981 | Satter et al. | |
| 4,291,766 A | 9/1981 | Davies et al. | |
| 4,305,463 A | 12/1981 | Zakiewicz | |
| 4,336,842 A | 6/1982 | Graham et al. | |
| 4,352,674 A | 10/1982 | Fery | |
| 4,353,806 A | 10/1982 | Canter et al. | |
| 4,387,769 A | 6/1983 | Erbstoesser et al. | |
| 4,392,988 A | 7/1983 | Dobson et al. | |
| 4,399,866 A | 8/1983 | Dearth | |
| 4,415,805 A | 11/1983 | Fertl et al. | |
| 4,428,427 A | 1/1984 | Friedman | |
| 4,439,489 A | 3/1984 | Johnson et al. | |
| 4,441,556 A | 4/1984 | Powers et al. | |
| 4,443,347 A | 4/1984 | Underdown et al. | |
| 4,460,052 A | 7/1984 | Gockel | |
| 4,470,915 A | 9/1984 | Conway | |
| 4,493,875 A | 1/1985 | Beck et al. | |
| 4,494,605 A | 1/1985 | Wiechel et al. | |
| 4,498,995 A | 2/1985 | Gockel | |
| 4,501,328 A | 2/1985 | Nichols | |
| 4,526,695 A | 7/1985 | Erbstoesser et al. | |
| 4,527,627 A | 7/1985 | Graham et al. | |
| 4,541,489 A | 9/1985 | Wu | |
| 4,546,012 A | 10/1985 | Brooks | |
| 4,553,596 A | 11/1985 | Graham et al. | |
| 4,564,459 A | 1/1986 | Underdown et al. | |
| 4,572,803 A | 2/1986 | Yamazoe et al. | |
| 4,585,064 A | 4/1986 | Graham et al. | |
| 4,649,998 A | 3/1987 | Friedman | |
| 4,662,449 A | 5/1987 | Friedman | |
| 4,664,819 A | 5/1987 | Glaze et al. | |
| 4,665,988 A | 5/1987 | Murphey et al. | |
| 4,669,543 A | 6/1987 | Young | |
| 4,670,501 A | 6/1987 | Dymond et al. | |
| 4,675,140 A | 6/1987 | Sparks et al. | |
| 4,681,165 A | 7/1987 | Bannister | |
| 4,683,954 A | 8/1987 | Walker et al. | |
| 4,694,905 A | 9/1987 | Armbruster | |
| 4,715,967 A | 12/1987 | Bellis | |
| 4,716,964 A | 1/1988 | Erbstoesser et al. | |
| 4,733,729 A | 3/1988 | Copeland | |
| 4,739,832 A | 4/1988 | Jennings, Jr. et al. | |
| 4,772,646 A | 9/1988 | Harms et al. | |
| 4,777,200 A | 10/1988 | Dymond et al. | |
| 4,785,884 A | 11/1988 | Armbruster | |
| 4,787,453 A | 11/1988 | Hewgill et al. | |
| 4,789,105 A | 12/1988 | Hosokawa et al. | |
| 4,796,701 A | 1/1989 | Hudson et al. | |
| 4,797,262 A | 1/1989 | Dewitz | |
| 4,800,960 A | 1/1989 | Friedman et al. | |
| 4,809,783 A | 3/1989 | Hollenbeck et al. | |
| 4,817,721 A | 4/1989 | Pober | |
| 4,829,100 A | 5/1989 | Murphey et al. | |
| 4,838,352 A | 6/1989 | Oberste-Padtberg et al. | |
| 4,842,070 A | 6/1989 | Sharp | |
| 4,842,072 A | 6/1989 | Friedman et al. | |
| 4,843,118 A | 6/1989 | Lai et al. | |
| 4,848,467 A | 7/1989 | Cantu et al. | |
| 4,848,470 A | 7/1989 | Korpics | |
| 4,850,430 A | 7/1989 | Copeland et al. | |
| 4,875,525 A | 10/1989 | Mana | |
| 4,886,354 A | 12/1989 | Welch et al. | |
| 4,888,240 A | 12/1989 | Graham et al. | |
| 4,892,147 A | 1/1990 | Jennings, Jr. et al. | |
| 4,895,207 A | 1/1990 | Friedman et al. | |
| 4,898,750 A | 2/1990 | Friedman et al. | |
| 4,903,770 A | 2/1990 | Friedman et al. | |
| 4,921,576 A | 5/1990 | Hurd | |
| 4,934,456 A | 6/1990 | Moradi-Araghi | |
| 4,936,385 A | 6/1990 | Weaver et al. | |
| 4,942,186 A | 7/1990 | Murphey et al. | |
| 4,957,165 A | 9/1990 | Cantu et al. | |
| 4,959,432 A | 9/1990 | Fan et al. | |
| 4,961,466 A | 10/1990 | Himes et al. | |
| 4,969,522 A | 11/1990 | Whitehurst et al. | |
| 4,969,523 A | 11/1990 | Martin et al. | |
| 4,984,635 A | 1/1991 | Cullick et al. | |
| 4,986,353 A | 1/1991 | Clark et al. | |
| 4,986,354 A | 1/1991 | Cantu et al. | |

| Patent No. | Date | Inventor(s) |
|---|---|---|
| 4,986,355 A | 1/1991 | Casad et al. |
| 5,030,603 A | 7/1991 | Rumpf et al. |
| 5,049,743 A | 9/1991 | Taylor, III et al. |
| 5,056,597 A | 10/1991 | Stowe, III et al. |
| 5,082,056 A | 1/1992 | Tackett, Jr. |
| 5,095,987 A | 3/1992 | Weaver et al. |
| 5,105,886 A | 4/1992 | Strubhar et al. |
| 5,107,928 A | 4/1992 | Hilterhaus |
| 5,128,390 A | 7/1992 | Murphey et al. |
| 5,135,051 A | 8/1992 | Facteau et al. |
| 5,142,023 A | 8/1992 | Gruber et al. |
| 5,165,438 A | 11/1992 | Facteau et al. |
| 5,173,527 A | 12/1992 | Calve |
| 5,178,218 A | 1/1993 | Dees |
| 5,182,051 A | 1/1993 | Bandy et al. |
| 5,199,491 A | 4/1993 | Kutta et al. |
| 5,199,492 A | 4/1993 | Surles et al. |
| 5,211,234 A | 5/1993 | Floyd |
| 5,216,050 A | 6/1993 | Sinclair |
| 5,218,038 A | 6/1993 | Johnson et al. |
| 5,232,955 A | 8/1993 | Csabai et al. |
| 5,232,961 A | 8/1993 | Murphey et al. |
| 5,238,068 A | 8/1993 | Fredrickson |
| 5,244,362 A | 9/1993 | Conally et al. |
| 5,247,059 A | 9/1993 | Gruber et al. |
| 5,249,627 A | 10/1993 | Harms et al. |
| 5,249,628 A | 10/1993 | Surjaatmadja |
| 5,256,729 A | 10/1993 | Kutts et al. |
| 5,265,678 A | 11/1993 | Grundmann |
| 5,273,115 A | 12/1993 | Spafford |
| 5,278,203 A | 1/1994 | Harms |
| 5,285,849 A | 2/1994 | Surles et al. |
| 5,293,939 A | 3/1994 | Surles et al. |
| 5,295,542 A | 3/1994 | Cole et al. |
| 5,320,171 A | 6/1994 | Laramay |
| 5,321,062 A | 6/1994 | Landrum et al. |
| 5,325,923 A | 7/1994 | Surjaatmadja et al. |
| 5,330,005 A | 7/1994 | Card et al. |
| 5,332,037 A | 7/1994 | Schmidt et al. |
| 5,335,726 A | 8/1994 | Rodrigues |
| 5,351,754 A | 10/1994 | Hardin et al. |
| 5,358,051 A | 10/1994 | Rodrigues |
| 5,359,026 A | 10/1994 | Gruber |
| 5,360,068 A | 11/1994 | Sprunt et al. |
| 5,361,856 A | 11/1994 | Surjaatmadja et al. |
| 5,363,916 A | 11/1994 | Himes et al. |
| 5,373,901 A | 12/1994 | Norman et al. |
| 5,377,756 A | 1/1995 | Northrop et al. |
| 5,377,759 A | 1/1995 | Surles |
| 5,381,864 A | 1/1995 | Nguyen et al. |
| 5,386,874 A | 2/1995 | Laramay et al. |
| 5,388,648 A | 2/1995 | Jordan, Jr. |
| 5,390,741 A | 2/1995 | Payton et al. |
| 5,393,810 A | 2/1995 | Harris et al. |
| 5,396,957 A | 3/1995 | Surjaatmadja et al. |
| 5,402,846 A | 4/1995 | Jennings, Jr. et al. |
| 5,403,822 A | 4/1995 | Mueller et al. |
| 5,420,174 A | 5/1995 | Dewprashad |
| 5,422,183 A | 6/1995 | Sinclair et al. |
| 5,423,381 A | 6/1995 | Surles et al. |
| 5,439,055 A | 8/1995 | Card et al. |
| 5,460,226 A | 10/1995 | Lawton et al. |
| 5,464,060 A | 11/1995 | Hale et al. |
| 5,475,080 A | 12/1995 | Gruber et al. |
| 5,484,881 A | 1/1996 | Gruber et al. |
| 5,492,177 A | 2/1996 | Yeh et al. |
| 5,492,178 A | 2/1996 | Nguyen et al. |
| 5,494,103 A | 2/1996 | Surjaatmadja et al. |
| 5,497,830 A | 3/1996 | Boles et al. |
| 5,498,280 A | 3/1996 | Fistner et al. |
| 5,499,678 A | 3/1996 | Surjaatmadja et al. |
| 5,501,275 A | 3/1996 | Card et al. |
| 5,505,787 A | 4/1996 | Yamaguchi |
| 5,512,071 A | 4/1996 | Yam et al. |
| 5,520,250 A | 5/1996 | Harry et al. |
| 5,522,460 A | 6/1996 | Shu |
| 5,529,123 A | 6/1996 | Carpenter et al. |
| 5,531,274 A | 7/1996 | Bienvenu, Jr. |
| 5,536,807 A | 7/1996 | Gruber et al. |
| 5,545,824 A | 8/1996 | Stengel et al. |
| 5,547,023 A | 8/1996 | McDaniel et al. |
| 5,551,513 A | 9/1996 | Surles et al. |
| 5,551,514 A | 9/1996 | Nelson et al. |
| 5,582,249 A | 12/1996 | Caveny et al. |
| 5,582,250 A | 12/1996 | Constien |
| 5,588,488 A | 12/1996 | Vijn et al. |
| 5,591,700 A | 1/1997 | Harris et al. |
| 5,594,095 A | 1/1997 | Gruber et al. |
| 5,595,245 A | 1/1997 | Scott, III |
| 5,597,784 A | 1/1997 | Sinclair et al. |
| 5,604,184 A | 2/1997 | Ellis et al. |
| 5,604,186 A | 2/1997 | Hunt et al. |
| 5,609,207 A | 3/1997 | Dewprashed et al. |
| 5,620,049 A | 4/1997 | Gipson et al. |
| 5,639,806 A | 6/1997 | Johnson et al. |
| 5,663,123 A | 9/1997 | Goodhue, Jr. et al. |
| 5,670,473 A | 9/1997 | Scepanski |
| 5,680,900 A | 10/1997 | Nguyen ........................ 166/295 |
| 5,692,566 A | 12/1997 | Surles |
| 5,697,440 A | 12/1997 | Weaver et al. |
| 5,697,448 A | 12/1997 | Johnson |
| 5,698,322 A | 12/1997 | Tsai et al. |
| 5,701,956 A | 12/1997 | Hardy et al. |
| 5,712,314 A | 1/1998 | Surles et al. |
| 5,732,364 A | 3/1998 | Kalb et al. |
| 5,738,136 A | 4/1998 | Rosenberg |
| 5,765,642 A | 6/1998 | Surjaatmadja |
| 5,775,425 A | 7/1998 | Weaver et al. |
| 5,782,300 A | 7/1998 | James et al. |
| 5,783,822 A | 7/1998 | Buchanan et al. |
| 5,787,986 A | 8/1998 | Weaver et al. |
| 5,791,415 A | 8/1998 | Nguyen et al. |
| 5,799,734 A | 9/1998 | Norman et al. |
| 5,806,593 A | 9/1998 | Surles |
| 5,830,987 A | 11/1998 | Smith |
| 5,833,000 A | 11/1998 | Weaver et al. |
| 5,833,361 A | 11/1998 | Funk |
| 5,836,391 A | 11/1998 | Jonasson et al. |
| 5,836,392 A | 11/1998 | Urlwin-Smith |
| 5,836,393 A | 11/1998 | Johnson |
| 5,837,656 A | 11/1998 | Sinclair et al. |
| 5,837,785 A | 11/1998 | Kinsho et al. |
| 5,839,510 A | 11/1998 | Weaver et al. |
| 5,840,784 A | 11/1998 | Funkhouser et al. |
| 5,849,401 A | 12/1998 | El-Afandi et al. |
| 5,849,590 A | 12/1998 | Anderson, II et al. |
| 5,853,048 A | 12/1998 | Weaver et al. |
| 5,864,003 A | 1/1999 | Qureshi et al. |
| 5,865,936 A | 2/1999 | Edelman et al. |
| 5,871,049 A | 2/1999 | Weaver et al. |
| 5,873,413 A | 2/1999 | Chatterji et al. |
| 5,874,490 A | 2/1999 | Arora et al. |
| 5,875,844 A | 3/1999 | Chatterji et al. |
| 5,875,845 A | 3/1999 | Chatterji et al. |
| 5,875,846 A | 3/1999 | Chatterji et al. |
| 5,893,383 A | 4/1999 | Facteau |
| 5,893,416 A | 4/1999 | Read |
| 5,901,789 A | 5/1999 | Donnelly et al. |
| 5,908,073 A | 6/1999 | Nguyen et al. |
| 5,911,282 A | 6/1999 | Onan et al. |
| 5,913,364 A | 6/1999 | Sweatman |
| 5,916,933 A | 6/1999 | Johnson et al. |
| 5,921,317 A | 7/1999 | Dewprashad et al. |
| 5,924,488 A | 7/1999 | Nguyen et al. |
| 5,929,437 A | 7/1999 | Elliott et al. |
| 5,944,105 A | 8/1999 | Nguyen |
| 5,944,106 A | 8/1999 | Dalrymple et al. |
| 5,945,387 A | 8/1999 | Chatterji et al. |
| 5,948,734 A | 9/1999 | Sinclair et al. |
| 5,957,204 A | 9/1999 | Chatterji et al. |
| 5,960,784 A | 10/1999 | Ryan |
| 5,960,877 A | 10/1999 | Funkhouser |
| 5,960,878 A | 10/1999 | Nguyen et al. |
| 5,960,880 A | 10/1999 | Nguyen et al. |
| 5,964,291 A | 10/1999 | Bourne et al. |
| 5,969,006 A | 10/1999 | Onan et al. |
| 5,969,823 A | 10/1999 | Wurz et al. |
| 5,977,283 A | 11/1999 | Rossitto |

| | | | | | | |
|---|---|---|---|---|---|---|
| 5,994,785 | A | 11/1999 | Higuchi et al. | 6,328,105 B1 | 12/2001 | Betzold |
| RE36,466 | E | 12/1999 | Nelson et al. | 6,328,106 B1 | 12/2001 | Griffith et al. |
| 6,003,600 | A | 12/1999 | Nguyen et al. | 6,330,916 B1 | 12/2001 | Rickards et al. |
| 6,004,400 | A | 12/1999 | Bishop et al. | 6,330,917 B2 | 12/2001 | Chatterji et al. |
| 6,006,835 | A | 12/1999 | Onan et al. | 6,342,467 B1 | 1/2002 | Chang et al. |
| 6,006,836 | A | 12/1999 | Chatterji et al. | 6,350,309 B2 | 2/2002 | Chatterji et al. |
| 6,012,524 | A | 1/2000 | Chatterji et al. | 6,357,527 B1 | 3/2002 | Norman et al. |
| 6,016,870 | A | 1/2000 | Dewprashad et al. | 6,364,018 B1 | 4/2002 | Brannon et al. |
| 6,024,170 | A | 2/2000 | McCabe et al. | 6,364,945 B1 | 4/2002 | Chatterji et al. |
| 6,028,113 | A | 2/2000 | Scepanski | 6,367,165 B1 | 4/2002 | Huttlin |
| 6,028,534 | A | 2/2000 | Ciglenec et al. | 6,367,549 B1 | 4/2002 | Chatterji et al. |
| 6,035,936 | A | 3/2000 | Whalen | 6,372,678 B1 | 4/2002 | Youngsman et al. |
| 6,040,398 | A | 3/2000 | Kinsho et al. | 6,376,571 B1 | 4/2002 | Chawla et al. |
| 6,047,772 | A | 4/2000 | Weaver et al. | 6,387,986 B1 | 5/2002 | Moradi-Araghi et al. |
| 6,059,034 | A | 5/2000 | Rickards et al. | 6,390,195 B1 | 5/2002 | Nguyen et al. |
| 6,059,035 | A | 5/2000 | Chatterji et al. | 6,394,181 B2 | 5/2002 | Schnatzmeyer et al. |
| 6,059,036 | A | 5/2000 | Chatterji et al. | 6,401,817 B1 | 6/2002 | Griffith et al. |
| 6,063,738 | A | 5/2000 | Chatterji et al. | 6,405,796 B1 | 6/2002 | Meyer et al. |
| 6,068,055 | A | 5/2000 | Chatterji et al. | 6,405,797 B2 | 6/2002 | Davidson et al. |
| 6,069,117 | A | 5/2000 | Onan et al. | 6,406,789 B1 | 6/2002 | McDaniel et al. |
| 6,070,667 | A | 6/2000 | Gano | 6,408,943 B1 | 6/2002 | Schultz et al. |
| 6,074,739 | A | 6/2000 | Katagiri | 6,415,509 B1 | 7/2002 | Echols et al. |
| 6,079,492 | A | 6/2000 | Hoogteijling et al. | 6,422,183 B1 | 7/2002 | Kato |
| 6,098,711 | A | 8/2000 | Chatterji et al. | 6,422,314 B1 | 7/2002 | Todd et al. |
| 6,114,410 | A | 9/2000 | Betzold | 6,439,309 B1 | 8/2002 | Matherly et al. |
| 6,123,871 | A | 9/2000 | Carroll | 6,439,310 B1 | 8/2002 | Scott, III et al. |
| 6,123,965 | A | 9/2000 | Jacon et al. | 6,440,255 B1 | 8/2002 | Kohlhammer et al. |
| 6,124,246 | A | 9/2000 | Heathman et al. | 6,446,727 B1 | 9/2002 | Zemlak et al. |
| 6,130,286 | A | 10/2000 | Thomas et al. | 6,448,206 B1 | 9/2002 | Griffith et al. |
| 6,131,661 | A | 10/2000 | Conner et al. | 6,450,260 B1 | 9/2002 | James et al. |
| 6,135,987 | A | 10/2000 | Tsai et al. | 6,454,003 B1 | 9/2002 | Chang et al. |
| 6,140,446 | A | 10/2000 | Fujiki et al. | 6,457,518 B1 | 10/2002 | Castano-Mears et al. |
| 6,143,698 | A | 11/2000 | Murphey et al. | 6,458,885 B1 | 10/2002 | Stengel et al. |
| 6,148,911 | A | 11/2000 | Gipson et al. | 6,478,092 B2 | 11/2002 | Voll et al. |
| 6,152,234 | A | 11/2000 | Newhouse et al. | 6,485,947 B1 | 11/2002 | Rajgarhia et al. |
| 6,162,766 | A | 12/2000 | Muir et al. | 6,488,091 B1 | 12/2002 | Weaver et al. |
| 6,165,947 | A | 12/2000 | Chang et al. | 6,488,763 B2 | 12/2002 | Brothers et al. |
| 6,167,967 | B1 | 1/2001 | Sweatman | 6,494,263 B2 | 12/2002 | Todd |
| 6,169,058 | B1 | 1/2001 | Le et al. | 6,503,870 B1 | 1/2003 | Griffith et al. |
| 6,172,011 | B1 | 1/2001 | Card et al. | 6,508,305 B1 | 1/2003 | Brannon et al. |
| 6,172,077 | B1 | 1/2001 | Curtis et al. | 6,510,896 B2 | 1/2003 | Bode et al. |
| 6,176,315 | B1 | 1/2001 | Reddy et al. | 6,520,255 B2 | 2/2003 | Tolman et al. |
| 6,177,484 | B1 | 1/2001 | Surles | 6,527,051 B1 | 3/2003 | Reddy et al. |
| 6,184,311 | B1 | 2/2001 | O'Keeffe et al. | 6,528,157 B1 | 3/2003 | Hussain et al. |
| 6,186,228 | B1 | 2/2001 | Wegener et al. | 6,531,427 B1 | 3/2003 | Shuchart et al. |
| 6,187,834 | B1 | 2/2001 | Thayer et al. | 6,534,449 B1 | 3/2003 | Gilmour et al. |
| 6,187,839 | B1 | 2/2001 | Eoff | 6,536,939 B1 | 3/2003 | Blue |
| 6,189,615 | B1 | 2/2001 | Sydansky | 6,538,576 B1 | 3/2003 | Schultz et al. |
| 6,192,985 | B1 | 2/2001 | Hinkel et al. | 6,543,545 B1 | 4/2003 | Chatterji et al. |
| 6,192,986 | B1 | 2/2001 | Urlwin-Smith | 6,550,959 B2 | 4/2003 | Huber et al. |
| 6,196,317 | B1 | 3/2001 | Hardy | 6,552,333 B1 | 4/2003 | Storm et al. |
| 6,202,751 | B1 | 3/2001 | Chatterji et al. | 6,554,071 B1 | 4/2003 | Reddy et al. |
| 6,209,643 | B1 | 4/2001 | Nguyen et al. | 6,555,507 B2 | 4/2003 | Chatterji et al. |
| 6,209,644 | B1 | 4/2001 | Brunet | 6,569,814 B1 | 5/2003 | Brady et al. |
| 6,209,646 | B1 | 4/2001 | Reddy et al. | 6,582,819 B2 | 6/2003 | McDaniel et al. |
| 6,210,471 | B1 | 4/2001 | Craig | 6,588,926 B2 | 7/2003 | Huber et al. |
| 6,214,773 | B1 | 4/2001 | Harris et al. | 6,588,928 B2 | 7/2003 | Huber et al. |
| 6,231,664 | B1 | 5/2001 | Chatterji et al. | 6,593,402 B2 | 7/2003 | Chatterji et al. |
| 6,234,251 | B1 | 5/2001 | Chatterji et al. | 6,599,863 B1 | 7/2003 | Palmer et al. |
| 6,238,597 | B1 | 5/2001 | Yim et al. | 6,608,162 B1 | 8/2003 | Chiu et al. |
| 6,241,019 | B1 | 6/2001 | Davidson et al. | 6,609,578 B2 | 8/2003 | Patel et al. |
| 6,242,390 | B1 | 6/2001 | Mitchell et al. | 6,616,320 B2 | 9/2003 | Huber et al. |
| 6,244,344 | B1 | 6/2001 | Chatterji et al. | 6,620,857 B2 | 9/2003 | Valet |
| 6,257,335 | B1 | 7/2001 | Nguyen et al. | 6,626,241 B2 | 9/2003 | Nguyen |
| 6,258,757 | B1 | 7/2001 | Sweatman et al. | 6,632,527 B1 | 10/2003 | McDaniel et al. |
| 6,260,622 | B1 | 7/2001 | Blok et al. | 6,632,778 B1 | 10/2003 | Ayoub et al. |
| 6,271,181 | B1 | 8/2001 | Chatterji et al. | 6,632,892 B2 | 10/2003 | Rubinsztajn et al. |
| 6,274,650 | B1 | 8/2001 | Cui | 6,642,309 B2 | 11/2003 | Komitsu et al. |
| 6,279,652 | B1 | 8/2001 | Chatterji et al. | 6,648,501 B2 | 11/2003 | Huber et al. |
| 6,279,656 | B1 | 8/2001 | Sinclair et al. | 6,653,436 B2 | 11/2003 | Back ............................ 528/335 |
| 6,283,214 | B1 | 9/2001 | Guinot et al. | 6,659,179 B2 | 12/2003 | Nguyen |
| 6,302,207 | B1 | 10/2001 | Nguyen et al. | 6,664,343 B2 | 12/2003 | Narisawa et al. |
| 6,306,998 | B1 | 10/2001 | Kimura et al. | 6,667,279 B1 | 12/2003 | Hessert et al. |
| 6,310,008 | B1 | 10/2001 | Rietjens | 6,668,926 B2 | 12/2003 | Nguyen et al. |
| 6,311,773 | B1 | 11/2001 | Todd et al. | 6,669,771 B2 | 12/2003 | Tokiwa et al. |
| 6,315,040 | B1 | 11/2001 | Donnelly | 6,677,426 B2 | 1/2004 | Noro et al. |
| 6,321,841 | B1 | 11/2001 | Eoff et al. | 6,681,856 B1 | 1/2004 | Chatterji et al. |
| 6,323,307 | B1 | 11/2001 | Bigg et al. | 6,686,328 B1 | 2/2004 | Binder |
| 6,326,458 | B1 | 12/2001 | Gruber et al. | 6,705,400 B1 | 3/2004 | Nguyen et al. |

| Patent | Date | Inventor |
|---|---|---|
| 6,705,440 B2 | 3/2004 | Phelan et al. |
| 6,710,019 B1 | 3/2004 | Sawdon et al. |
| 6,713,170 B1 | 3/2004 | Kaneko et al. |
| 6,725,926 B2 | 4/2004 | Nguyen et al. |
| 6,725,930 B2 | 4/2004 | Boney et al. |
| 6,725,931 B2 | 4/2004 | Nguyen et al. |
| 6,725,981 B1 | 4/2004 | Franz |
| 6,729,404 B2 | 5/2004 | Nguyen et al. |
| 6,729,405 B2 | 5/2004 | DiLullo et al. |
| 6,732,800 B2 | 5/2004 | Acock et al. |
| 6,745,159 B1 | 6/2004 | Todd et al. |
| 6,749,025 B1 | 6/2004 | Brannon et al. |
| 6,753,299 B2 | 6/2004 | Lunghofer et al. |
| 6,763,888 B1 | 7/2004 | Harris et al. |
| 6,764,981 B1 | 7/2004 | Eoff et al. |
| 6,766,858 B2 | 7/2004 | Nguyen et al. |
| 6,776,235 B1 | 8/2004 | England |
| 6,776,236 B1 | 8/2004 | Nguyen |
| 6,817,414 B2 | 11/2004 | Lee |
| 6,830,105 B2 | 12/2004 | Thesing |
| 6,832,650 B2 | 12/2004 | Nguyen et al. |
| 6,832,655 B2 | 12/2004 | Ravensbergen et al. |
| 6,837,309 B2 | 1/2005 | Boney et al. |
| 6,840,318 B2 | 1/2005 | Lee et al. |
| 6,851,474 B2 | 2/2005 | Nguyen |
| 6,852,173 B2 | 2/2005 | Banerjee et al. |
| 6,861,394 B2 | 3/2005 | Ballard et al. |
| 6,866,099 B2 | 3/2005 | Nguyen |
| 6,877,560 B2 | 4/2005 | Nguyen et al. |
| 6,881,709 B2 | 4/2005 | Nelson et al. |
| 6,886,635 B2 | 5/2005 | Hossaini et al. |
| 6,887,834 B2 | 5/2005 | Nguyen et al. |
| 6,892,813 B2 | 5/2005 | Nguyen et al. |
| 6,920,929 B2 | 7/2005 | Bour |
| 6,949,491 B2 | 9/2005 | Cooke, Jr. |
| 6,956,086 B2 | 10/2005 | Back .................. 525/423 |
| 6,962,200 B2 | 11/2005 | Nguyen et al. |
| 6,978,836 B2 | 12/2005 | Nguyen et al. |
| 6,981,560 B2 | 1/2006 | Nguyen et al. |
| 6,997,259 B2 | 2/2006 | Nguyen |
| 7,007,752 B2 | 3/2006 | Reddy et al. |
| 7,013,976 B2 | 3/2006 | Nguyen et al. |
| 7,017,665 B2 | 3/2006 | Nguyen |
| 7,021,379 B2 | 4/2006 | Nguyen et al. |
| 7,025,134 B2 | 4/2006 | Byrd et al. |
| 7,028,774 B2 | 4/2006 | Nguyen et al. |
| 7,032,667 B2 | 4/2006 | Nguyen et al. |
| 7,036,587 B2 | 5/2006 | Munoz .................. 166/279 |
| 7,036,589 B2 | 5/2006 | Nguyen |
| 7,040,403 B2 | 5/2006 | Nguyen et al. |
| 7,040,419 B2 | 5/2006 | Chatterji .................. 175/69 |
| 7,044,220 B2 | 5/2006 | Nguyen et al. |
| 7,049,272 B2 | 5/2006 | Sinclair et al. |
| 7,059,406 B2 | 6/2006 | Nguyen |
| 7,063,150 B2 | 6/2006 | Slabaugh et al. |
| 7,066,258 B2 | 6/2006 | Justus et al. |
| 7,073,581 B2 | 7/2006 | Nguyen et al. |
| 7,077,219 B1 | 7/2006 | Chatterji .................. 175/66 |
| 7,080,688 B2 | 7/2006 | Todd et al. |
| 7,081,439 B2 | 7/2006 | Sullivan et al. |
| 7,093,658 B2 | 8/2006 | Chatterji et al. |
| 7,096,947 B2 | 8/2006 | Todd .................. 166/283 |
| 7,104,325 B2 | 9/2006 | Nguyen et al. |
| 7,114,560 B2 | 10/2006 | Nguyen et al. |
| 7,114,570 B2 | 10/2006 | Nguyen et al. |
| 7,117,942 B2 | 10/2006 | Dalrymple et al. |
| 7,124,822 B2 | 10/2006 | Chatterji .................. 166/278 |
| 7,131,491 B2 | 11/2006 | Blauch et al. |
| 7,153,575 B2 | 12/2006 | Anderson et al. |
| 7,156,194 B2 | 1/2007 | Nguyen |
| 7,166,560 B2 | 1/2007 | Still et al. |
| 7,178,596 B2 | 2/2007 | Blauch et al. |
| 7,204,311 B2 | 4/2007 | Welton et al. |
| 7,210,528 B1 | 5/2007 | Brannon et al. |
| 7,211,547 B2 | 5/2007 | Nguyen |
| 7,211,548 B2 | 5/2007 | Munoz .................. 507/212 |
| 7,216,711 B2 | 5/2007 | Nguyen et al. |
| 7,237,609 B2 | 7/2007 | Nguyen |
| 7,251,169 B2 | 7/2007 | Takeuchi |
| 7,252,146 B2 | 8/2007 | Slabaugh et al. |
| 7,255,169 B2 | 8/2007 | van Batenburg et al. |
| 7,261,156 B2 | 8/2007 | Nguyen et al. |
| 7,264,051 B2 | 9/2007 | Nguyen et al. |
| 7,264,052 B2 | 9/2007 | Nguyen et al. |
| 7,265,079 B2 | 9/2007 | Willberg et al. |
| 7,267,171 B2 | 9/2007 | Dusterhoft et al. |
| 7,267,717 B2 | 9/2007 | Watanabe et al. |
| 7,273,099 B2 | 9/2007 | East, Jr. et al. |
| 7,281,580 B2 | 10/2007 | Parker et al. |
| 7,281,581 B2 | 10/2007 | Nguyen et al. |
| 7,281,583 B2 * | 10/2007 | Whitfill et al. .................. 166/300 |
| 7,287,594 B1 | 10/2007 | Chatterji .................. 166/308.6 |
| 7,299,875 B2 | 11/2007 | Nguyen et al. |
| 7,306,037 B2 | 12/2007 | Nguyen et al. |
| 7,334,635 B2 | 2/2008 | Nguyen |
| 7,334,636 B2 | 2/2008 | Nguyen |
| 7,343,973 B2 | 3/2008 | Dusterhoft et al. |
| 7,407,916 B2 | 8/2008 | Chatterji .................. 507/240 |
| 7,541,318 B2 | 6/2009 | Weaver et al. |
| 7,766,099 B2 * | 8/2010 | Nguyen .................. 175/72 |
| 7,819,192 B2 | 10/2010 | Weaver et al. |
| 2001/0016562 A1 | 8/2001 | Muir et al. |
| 2002/0036088 A1 | 3/2002 | Todd |
| 2002/0043370 A1 | 4/2002 | Poe |
| 2002/0048676 A1 | 4/2002 | McDaniel et al. |
| 2002/0070020 A1 | 6/2002 | Nguyen |
| 2002/0104217 A1 | 8/2002 | Echols et al. |
| 2002/0160920 A1 | 10/2002 | Dawson et al. |
| 2002/0169085 A1 | 11/2002 | Miller et al. |
| 2002/0189808 A1 | 12/2002 | Nguyen et al. |
| 2003/0006036 A1 | 1/2003 | Malone et al. |
| 2003/0013871 A1 | 1/2003 | Mallon et al. |
| 2003/0060374 A1 | 3/2003 | Cooke, Jr. |
| 2003/0106690 A1 | 6/2003 | Boney et al. |
| 2003/0114314 A1 | 6/2003 | Ballard et al. |
| 2003/0114317 A1 | 6/2003 | Benton et al. |
| 2003/0130133 A1 | 7/2003 | Vollmer |
| 2003/0131999 A1 | 7/2003 | Nguyen et al. |
| 2003/0148893 A1 | 8/2003 | Lunghofer et al. |
| 2003/0186820 A1 | 10/2003 | Thesing |
| 2003/0188766 A1 | 10/2003 | Banerjee et al. |
| 2003/0188872 A1 | 10/2003 | Nguyen et al. |
| 2003/0196805 A1 | 10/2003 | Boney et al. |
| 2003/0205376 A1 | 11/2003 | Ayoub et al. |
| 2003/0230408 A1 | 12/2003 | Acock et al. |
| 2003/0230431 A1 | 12/2003 | Reddy et al. |
| 2003/0234103 A1 | 12/2003 | Lee et al. |
| 2004/0000402 A1 | 1/2004 | Nguyen et al. |
| 2004/0014607 A1 | 1/2004 | Sinclair et al. |
| 2004/0014608 A1 | 1/2004 | Nguyen et al. |
| 2004/0040706 A1 | 3/2004 | Hossaini et al. |
| 2004/0040708 A1 | 3/2004 | Stephenson et al. |
| 2004/0040712 A1 | 3/2004 | Ravi et al. |
| 2004/0040713 A1 | 3/2004 | Nguyen et al. |
| 2004/0043906 A1 | 3/2004 | Heath et al. |
| 2004/0045712 A1 | 3/2004 | Eoff et al. |
| 2004/0048752 A1 | 3/2004 | Nguyen et al. |
| 2004/0055747 A1 | 3/2004 | Lee |
| 2004/0060702 A1 | 4/2004 | Kotlar et al. |
| 2004/0106525 A1 | 6/2004 | Wilbert et al. |
| 2004/0138068 A1 | 7/2004 | Rimmer et al. |
| 2004/0149441 A1 | 8/2004 | Nguyen et al. |
| 2004/0152601 A1 | 8/2004 | Still et al. |
| 2004/0152602 A1 | 8/2004 | Boles |
| 2004/0177961 A1 | 9/2004 | Nguyen et al. |
| 2004/0194960 A1 | 10/2004 | DiLullo et al. |
| 2004/0194961 A1 | 10/2004 | Nguyen et al. |
| 2004/0206499 A1 | 10/2004 | Nguyen et al. |
| 2004/0211559 A1 | 10/2004 | Nguyen et al. |
| 2004/0211561 A1 | 10/2004 | Nguyen et al. |
| 2004/0221992 A1 | 11/2004 | Nguyen et al. |
| 2004/0231845 A1 | 11/2004 | Cooke, Jr. |
| 2004/0231847 A1 | 11/2004 | Nguyen et al. |
| 2004/0256097 A1 | 12/2004 | Byrd et al. |
| 2004/0256099 A1 | 12/2004 | Nguyen et al. |
| 2004/0261993 A1 | 12/2004 | Nguyen |
| 2004/0261995 A1 | 12/2004 | Nguyen et al. |
| 2004/0261997 A1 | 12/2004 | Nguyen et al. |

*Nossaini et al. corresponds to 2004/0040706 per the image (reading: Nossaini et al.)

| Pub. No. | Date | Inventor |
|---|---|---|
| 2004/0261999 A1 | 12/2004 | Nguyen |
| 2005/0000694 A1 | 1/2005 | Dalrymple et al. |
| 2005/0000731 A1 | 1/2005 | Nguyen et al. |
| 2005/0006093 A1 | 1/2005 | Nguyen et al. |
| 2005/0006095 A1 | 1/2005 | Justus et al. |
| 2005/0006096 A1 | 1/2005 | Nguyen et al. |
| 2005/0028976 A1 | 2/2005 | Nguyen |
| 2005/0028979 A1 | 2/2005 | Brannon et al. |
| 2005/0034862 A1 | 2/2005 | Nguyen |
| 2005/0034865 A1 | 2/2005 | Todd et al. |
| 2005/0045326 A1 | 3/2005 | Nguyen |
| 2005/0045330 A1 | 3/2005 | Nguyen et al. |
| 2005/0045384 A1 | 3/2005 | Nguyen |
| 2005/0051330 A1 | 3/2005 | Nguyen et al. |
| 2005/0051331 A1 | 3/2005 | Nguyen et al. |
| 2005/0059555 A1 | 3/2005 | Dusterhoft et al. |
| 2005/0061509 A1 | 3/2005 | Nguyen |
| 2005/0092489 A1 | 5/2005 | Welton et al. |
| 2005/0126780 A1 | 6/2005 | Todd et al. |
| 2005/0139359 A1 | 6/2005 | Maurer et al. |
| 2005/0145385 A1 | 7/2005 | Nguyen |
| 2005/0173116 A1 | 8/2005 | Nguyen et al. |
| 2005/0178551 A1 | 8/2005 | Tolman et al. |
| 2005/0194135 A1 | 9/2005 | Nguyen et al. |
| 2005/0194136 A1 | 9/2005 | Nguyen et al. |
| 2005/0194140 A1 | 9/2005 | Dalrymple et al. |
| 2005/0194142 A1 | 9/2005 | Nguyen |
| 2005/0197258 A1 | 9/2005 | Nguyen |
| 2005/0207001 A1 | 9/2005 | Laufer et al. |
| 2005/0257929 A1 | 11/2005 | Nguyen et al. |
| 2005/0263283 A1 | 12/2005 | Nguyen |
| 2005/0267001 A1 | 12/2005 | Weaver et al. |
| 2005/0269086 A1 | 12/2005 | Nguyen et al. |
| 2005/0269101 A1 | 12/2005 | Stegent et al. |
| 2005/0274510 A1 | 12/2005 | Nguyen et al. |
| 2005/0274517 A1 | 12/2005 | Blauch et al. |
| 2005/0274520 A1 | 12/2005 | Nguyen et al. |
| 2005/0277554 A1 | 12/2005 | Blauch et al. |
| 2005/0284632 A1 | 12/2005 | Dalrymple et al. |
| 2005/0284637 A1 | 12/2005 | Stegent et al. |
| 2006/0048943 A1 | 3/2006 | Parker et al. |
| 2006/0048944 A1 | 3/2006 | van Batenburg et al. |
| 2006/0052251 A1 | 3/2006 | Anderson et al. |
| 2006/0089266 A1 | 4/2006 | Dusterhoft et al. |
| 2006/0113078 A1 | 6/2006 | Nguyen et al. |
| 2006/0124303 A1 | 6/2006 | Nguyen et al. |
| 2006/0124309 A1 | 6/2006 | Nguyen et al. |
| 2006/0137875 A1 | 6/2006 | Dusterhoft et al. |
| 2006/0157243 A1 | 7/2006 | Nguyen |
| 2006/0175058 A1 | 8/2006 | Nguyen |
| 2006/0219405 A1 | 10/2006 | Nguyen et al. |
| 2006/0219408 A1 | 10/2006 | Nguyen et al. |
| 2006/0234874 A1 | 10/2006 | Eoff et al. |
| 2006/0240994 A1 | 10/2006 | Eoff et al. |
| 2006/0240995 A1 | 10/2006 | Rickman et al. |
| 2006/0260810 A1 | 11/2006 | Weaver et al. |
| 2006/0260813 A1 | 11/2006 | Welton et al. |
| 2006/0264332 A1 | 11/2006 | Welton et al. |
| 2006/0266522 A1 | 11/2006 | Eoff et al. |
| 2006/0283592 A1 | 12/2006 | Sierra et al. |
| 2006/0289160 A1 | 12/2006 | van Batenburg et al. |
| 2007/0007010 A1 | 1/2007 | Welton et al. |
| 2007/0012445 A1 | 1/2007 | Nguyen et al. |
| 2007/0029087 A1 | 2/2007 | Nguyen et al. |
| 2007/0114032 A1 | 5/2007 | Stegent et al. |
| 2007/0131422 A1 | 6/2007 | Gatlin et al. |
| 2007/0131425 A1 | 6/2007 | Gatlin et al. |
| 2007/0187097 A1 | 8/2007 | Weaver et al. |
| 2007/0215354 A1 | 9/2007 | Rickman et al. |
| 2007/0267194 A1 | 11/2007 | Nguyen et al. |
| 2007/0289781 A1 | 12/2007 | Rickman et al. |
| 2008/0006405 A1 | 1/2008 | Rickman et al. |
| 2008/0006406 A1 | 1/2008 | Nguyen et al. |
| 2008/0110624 A1 | 5/2008 | Nguyen et al. |
| 2008/0135251 A1 | 6/2008 | Nguyen et al. |
| 2009/0253594 A1 | 10/2009 | Dalrymple et al. |
| 2010/0270023 A1 | 10/2010 | Dusterhoft |

FOREIGN PATENT DOCUMENTS

| | | |
|---|---|---|
| EP | 0313243 | 10/1988 |
| EP | 0528595 | 8/1992 |
| EP | 0506934 | 10/1992 |
| EP | 0510762 | 11/1992 |
| EP | 0643196 | 6/1994 |
| EP | 0834644 | 4/1998 |
| EP | 0853186 | 7/1998 |
| EP | 0864726 | 9/1998 |
| EP | 0879935 | 11/1998 |
| EP | 0933498 | 8/1999 |
| EP | 1001133 | 5/2000 |
| EP | 1132569 | 9/2001 |
| EP | 1326003 | 7/2003 |
| EP | 1362978 | 11/2003 |
| EP | 1394355 | 3/2004 |
| EP | 1396606 | 3/2004 |
| EP | 1398460 | 3/2004 |
| EP | 1403466 | 3/2004 |
| EP | 1464789 | 10/2004 |
| EP | 1607572 | 12/2005 |
| GB | 1107584 | 4/1965 |
| GB | 1264180 | 12/1969 |
| GB | 1292718 | 10/1972 |
| GB | 2298440 | 9/1996 |
| GB | 2382143 | 4/2001 |
| WO | WO 93/15127 | 8/1993 |
| WO | WO 94/07949 | 4/1994 |
| WO | WO 94/08078 | 4/1994 |
| WO | WO 94/08090 | 4/1994 |
| WO | WO 95/09879 | 4/1995 |
| WO | WO 97/11845 | 4/1997 |
| WO | WO 99/27229 | 6/1999 |
| WO | WO 01/81914 | 11/2001 |
| WO | WO 01/87797 | 11/2001 |
| WO | WO 02/12674 | 2/2002 |
| WO | WO 03/027431 | 4/2003 |
| WO | WO 2004009956 | 1/2004 |
| WO | WO 2004/037946 | 5/2004 |
| WO | WO 2004/038176 | 5/2004 |
| WO | WO 2004003600 | 9/2004 |
| WO | WO 2004090281 | 10/2004 |
| WO | WO 2004104368 | 12/2004 |
| WO | WO 2005/021928 | 3/2005 |
| WO | WO 2005080749 | 9/2005 |
| WO | WO 2006116868 | 5/2006 |
| WO | WO 2006103385 | 10/2006 |
| WO | WO 2007091007 | 8/2007 |
| WO | WO 2007091058 | 8/2007 |

OTHER PUBLICATIONS

Office Action for U.S. Appl. No. 11/351,931, dated Aug. 3, 2009.
Office Action for U.S. Appl. No. 11/880,230, dated Aug. 3, 2009.
Office Action for U.S. Appl. No. 11/351,931, dated Feb. 3, 2010.
Halliburton, "CoalStim$^{SM}$ Service, Helps Boost Cash Flow From CBM Assets," Stimulation, HO3679 Oct. 2003, Halliburton Communications.
Halliburton, "Conductivity Endurance Technology for High Permeability Reservoirs, Helps Prevent Intrusion of Formation Material Into the Proppant Pack for Improved Long-term Production," Stimulation, 2003, Halliburton Communications.
Halliburton, Expedite® Service, "A Step-Change Improvement Over Conventional Proppant Flowback Control Systems. Provides Up to Three Times the Conductivity of RCPs.," Stimulation, HO3296 May 2004, Halliburton Communicatioons.
Halliburton Technical Flier—Multi Stage Frac Completion Methods, 2 pages, May 2000.
Halliburton "CobraFrac$^{SM}$ Service, Coiled Tubing Fracturing—Cost-Effective Method for Stimulating Untapped Reserves," 2 pages, 2004.
Halliburton "CobraJetFrac$^{SM}$ Service, Cost-Effective Technology That Can Help Reduce Cost per BOE Produced, Shorten Cycle Time and Reduce Capex", Apr. 2003.
Halliburton "CobraFrac$^{SM}$ Service, Cost-Effective Method for Stimulating Untapped Reserves—Proved in More Than 30,000 Fracture Treatments", 2004.

Halliburton Cobra Frac Advertisement, 2001.

Halliburton "SurgiFrac$^{SM}$ Service, a Quick and Cost-Effective Method to Help Boost Production From Openhole Horizontal Completions", 2002.

Halliburton, "SandWedge® NT Conductivity Enhancement System, Enhances Proppant Pack Conductivity and Helps Prevent Intrusion of Formation Material for Improved Long-Term Production," Stimulation, HO2289, May 2004, Halliburton Communications.

Almond, et al., "Factors Affecting Proppant Flowback With Resin Coated Proppants," SPE 30096, pp. 171-186, May 1995.

Nguyen, et al., "A Novel Approach for Enhancing Proppant Consolidation: Laboratory Testing and Field Applications," SPE 77748, 2002

Wagner, et al., "Field Application of Lignosulfonate Gels to Reduce Channeling," South Swan Hills Miscible Unit, Alberta Canada, SPE 15547, 1986.

Owens, et al., "Waterflood Pressure Pulsing for Fractured Reservoirs," SPE 1123, 1966.

Felsenthal, et al., "Pressure Pulsing—An Improved Method of Waterflooding Fractured Reservoirs," SPE 1788, 1957.

Raza, "Water and Gas Cyclic Pulsing Method for Improved Oil Recovery," SPE 3005, 1971.

Peng, et al., "Pressure Pulsing Waterflooding in Dual Porosity Naturally Fractured Reservoirs," SPE 17587, 1988.

Dusseault, et al., "Pressure Pulse Workovers in Heavy Oil," SPE 79033, 2002.

Yang, et al., "Experimental Study on Fracture Initiation by Pressure Pulses," SPE 63035, 2000.

Nguyen, et al., "New Guidelines for Applying Curable Resin-Coated Proppants," SPE 39582, 1997.

Kazakov, et al., "Optimizing and Managing Coiled Tubing Frac Strings," SPE 60747, 2000.

"Degradable Aliphatic Polyesters," Advances in Polymer Science, vol. 157, edited by A.C. Albertson, pp. 1-138, 2001.

Simmons, et al., "Poly(phenyllactide): Synthesis, Characterization, and Hydrolytic Degradation," Biomacromolecules, vol. 2, No. 2, pp. 658-663, 2001.

Gidley, et al., "Recent Advances in Hydraulic Fracturing," Chapter 6, pp. 109-130, 1989.

Yin, et al., "Preparation and Characterization of Substituted Polylactides," American Chemical Society, vol. 32, No. 223, pp. 7711-7718, 1999.

Yin, et al., "Synthesis and Properties of Polymers Derived From Substituted Lactic Acids," American Chemical Society, Ch. 12, pp. 147-159, 2001.

Cantu, et al., "Laboratory and Field Evaluation of a Combined Fluid-Loss Control Additive and Gel Breaker for Fracturing Fluids," SPE 18211, 1990.

Love, et al., "Selectively Placing Many Fractures in Openhole Horizontal Wells Improves Production," SPE 50422, 1998.

McDaniel, et al., "Evolving New Stimulation Process Proves Highly Effective in Level 1 Dual-Lateral Completion," SPE 78697, 2002.

Dechy-Cabaret, et al., "Controlled Ring-Operated Polymerization of Lactide and Glycolide," American Chemical Society, Chemical Reviews, A-Z, AA-AD, 2004.

Funkhouser, et al., "Synthetic Polymer Fracturing Fluid for High-Temperature Applications," SPE 80236, 2003.

"Chelating Agents," Encyclopedia of Chemical Technology, vol. 5 (764-795), 2001.

Vichaibun, et al., "A New Assay for the Enzymatic Degradation of Polylactic Acid, Short Report," ScienceAsia, vol. 29, pp. 297-300, 2003.

CDX Gas, CDX Solution, 2003, CDX, LLC, available @ www.cdxgas.com/solution.html, printed pp. 1-2, Feb. 16, 2005.

CDX Gas, "What is Coalbed Methane?" CDX, LLC, available @ www.cdxgas.com/what.html, printed p. 1, Feb. 16, 2005.

Halliburton brochure entitled "H2Zero™ Service Introducing The Next Generation of Cost-Effective Conformance Control Solutions", 2002.

Halliburton brochure entitled "INJECTROL® A Component", 1999.

Halliburton brochure entitled "INJECTROL® G Sealant", 1999.

Halliburton brochure entitled "INJECTROL® IT Sealant",1999.

Halliburton brochure entitled "INJECTROL® Service Treatment", 1999.

Halliburton brochure entilted "INJECTROL® U Sealant", 1999.

Halliburton brochure entitled "Sanfix® A Resin", 1999.

Halliburton brochure entitled "Pillar Frac Stimulation Technique" Fracturing Services Technical Data Sheet, 2 pages, Jun. 1977.

"Santrol Bioballs"; http://www.fairmounminerals.com/.sub.—SANTROL/SANTROL%20Web%20Site/B.sub- .—TD.htm., Sep. 30, 2004.

Gorman, "Plastic Electric: Lining Up the Future of Conducting Polymers Science News," vol. 163, May 17, 2003.

Paccaloni, et al., "Key Factors for Enhanced Results of Matrix Stimulation," SPE 17154, Feb. 1988.

Paccaloni, et al., "Advances in Matrix Stimulation Technology," SPE 20623, Mar. 1993.

Nguyen, et al., "Controlling Proppant Flowback in High-Temperature, High-Production Wells," SPE 82215, May 2003.

Dusterhoft, et al., "Maximizing Effective Proppant Permeability under High-Stress, High Gas-Rate Conditions," SPE 90398, Sep. 2004.

International Search Report and Opinion (PCT/GB2004/002412), Sep. 16, 2004.

International Search Report and Opinion (PCT/GB2005/003845), Jul. 31, 2006.

International Search Report and Opinion (PCT/GB2005/004009), Jan. 11, 2006.

International Search Report (CPW 21582 EP), Mar. 11, 2005.

International Search Report and Opinion (PCT/GB2004/001497), Jul. 20, 2004.

International Search Report and Opinion (PCT/GB2004/001842), Dec. 10, 2004.

International Search Report and Opinion (PCT/GB2004/002674), Dec. 16, 2004.

International Search Report and Opinion (PCT/GB2004/002968), Nov. 16, 2004.

International Search Report and Opinion (PCT/GB2004/004242), Feb. 10, 2005.

International Search Report and Opinion (PCT/GB2004-000689), Jun. 4, 2004.

International Search Report and Opinion (PCT/GB2004/002727), Mar. 11, 2005.

International Search Report and Opinion (PCT/GB2004/002747), Mar. 11, 2005.

International Search Report and Opinion (PCT/GB2005/004010), Feb. 21, 2006.

International Search Report and Opinion (PCT/GB2006/004102), Feb. 20, 2007.

International Search Report and Opinion (PCT/GB2006/004137), Jun. 5, 2008.

International Search Report and Opinion (PCT/GB2006/004852), Mar. 7, 2007.

International Search Report and Opinion (PCT/GB2006/000366), Jun. 22, 2008.

International Search Report and Opinion (PCT/GB2005/003747), Dec. 12, 2005.

International Search Report and Opinion (PCT/GB2004/002948), Dec. 24, 2005.

International Search Report and Opinion (PCT/GB2005/000637), Jun. 2, 2005.

International Search Report and Opinion (PCT/GB007/002273), Sep. 3, 2007.

International Search Report and Opinion (PCT/GB2005/000634), Jun. 8, 2005.

International Preliminary Report on Patentability (PCT/GB2005/000634), Sep. 14, 2006.

International Search Report and Opinion (PCT/GB2007/000421), May 10, 2007.

International Search Report and Opinion (PCT/GB2007/000467), Jun. 15, 2007.

Office Action mailed Sep. 8, 2008 for U.S. Appl. No. 12/070,301, 2008.

Office Action mailed Mar. 11, 2009 for U.S. Appl. No. 12/070,301, 2009.

Office Action mailed Apr. 10, 2007 for U.S. Appl. No. 11/482,601, 2007.

Office Action mailed Sep. 21, 2007 for U.S. Appl. No. 11/482,601, 2007.
Office Action mailed Mar. 19, 2008 for U.S. Appl. No. 11/482,601, 2008.
Office Action mailed Sep. 8, 2008 for U.S. Appl. No. 11/482,601, 2008.
Office Action mailed Dec. 14, 2006 for U.S. Appl. No. 11/351,931, 2006.
Office Action mailed Oct. 4, 2007 for U.S. Appl. No. 11/351,931, 2007.
Office Action mailed Apr. 8, 2008 for U.S. Appl. No. 11/351,931, 2008.
Office Action mailed Jan. 21, 2009 for U.S. Appl. No. 11/351,931, 2009.
Office Action mailed Apr. 7, 2008 for U.S. Appl. No. 11/880,230, 2008.
Office Action mailed Jan. 22, 2009 for U.S. Appl. No. 11/880,230, 2009.
Office Action for U.S. Appl. No. 12/070,301 dated Jun. 29, 2010.
Notice of Allowance for U.S. Appl. No. 11/351,931 dated Aug. 9, 2010.
Office Action for U.S. Appl. No. 12/070,301, dated Jul. 20, 2009.
Office Action for U.S. Appl. No. 11/880,230 dated Dec. 23, 2010.

* cited by examiner

AQUEOUS-BASED EMULSIFIED CONSOLIDATING AGENTS SUITABLE FOR USE IN DRILL-IN APPLICATIONS

CROSS REFERENCE TO RELATED APPLICATIONS

The present application is a continuation-in-part of patent application Ser. No. 11/880,230, published as U.S. Patent Application No. 2007/0289781, entitled "Consolidating Agent Emulsions and Associated Methods," filed Aug. 30, 2007, which is itself a continuation-in-part of patent application Ser. No. 11/351,931, published as U.S. Patent Application No. 2007/0187097, entitled "Consolidating Agent Emulsions and Associated Methods," filed on Feb. 10, 2006, now U.S. Pat. No. 7,819,192 the entirety of both of the above disclosures is herein incorporated by reference.

BACKGROUND OF THE INVENTION

The present invention relates to aqueous-based emulsified consolidating agents suitable for use during drill-in operations. When drilling into a subterranean formation to reach a producing zone, it is generally necessary to drill through a substantial distance of non-producing formation before reaching the desired zone or zones. When the wellbore is drilled through the non-producing sections, a drilling mud is pumped into the drill string within the well and is then drawn up to the surface of the well through the annulus surrounding the drill string. The drill cuttings are entrained in the drilling mud and withdrawn from the well with the fluid. In addition to removing cuttings, the drilling mud also serves other functions such as lubricating the drill string and bit, cooling the drill bit, and providing sufficient hydrostatic pressure down hole to prevent the flow of formation fluids into the well. Generally, the drilling mud is a liquid with solids suspended therein. The solids function to impart desired rheological properties to the drilling mud and also to increase its density in order to provide a suitable hydrostatic pressure at the bottom of the well. The drilling mud may be either an aqueous-base mud or an oil-base mud.

While drilling muds are highly effective and cost relatively little, they are not suitable for drilling into the producing zone of a subterranean formation. This is because the make-up of the drilling mud tends to damage the producing formation and tends to complicate the completion process. Drilling muds minimize fluid loss by using solid fluid loss control agents which tend to form filtercakes and to shut off the invasion of fluid into formation. For these reasons, specially formulated "drill-in" compositions are used to drill the wellbore into producing portions of a subterranean formation so as to minimize damage and maximize production of exposed zones and to facilitate any necessary well completion needed. Unlike a drilling fluid, a drill-in fluid generally contains few solids, and what solids it does contain are often size controlled to minimize penetration or invasion into the formation matrix to avoid damaging the production formation. Generally, only those additives needed for filtration control and cuttings carrying are present in a drill-in fluid. These solids are designed to be removed physically or chemically after one or more completion operations before the well is put on production.

After a well is drilled into a portion of a subterranean formation, a variety of stimulation and completion operations may be performed before placing the well into production. One common operation involves consolidating the formation particulates to minimize the production of solids along with the desired fluids. In addition to maintaining a relatively solids-free production stream, consolidating particulates also aid in protecting the production flow paths of the formation. Flow of unconsolidated particulate material, such as formation fines, through the conductive channels in a subterranean formation tends to clog the conductive channels and may damage the interior of the formation or equipment.

There are several known techniques used to control particulate migration, some of which may involve the use of consolidating agents. The term "consolidating agent" as used herein includes any compound that is capable of minimizing particulate migration in a subterranean formation and/or modifying the stress-activated reactivity of subterranean fracture faces and other surfaces in subterranean formations. Such consolidating agents may be used once the drill-in process is complete by placing the consolidating agent into the formation such that it coats the unconsolidated particulates, making them adhere to one another and to consolidated matter within the formation such that the coated particulates are less likely to migrate through the conductive channels in the subterranean formation.

In producing zones that are weakly consolidated, it is desirable to stabilize the formation surrounding the wellbore as soon as possible to avoid excess clean-up costs and to ensure the integrity of the wellbore itself. Thus, it would be desirable to have a consolidating agent that could provide a means for consolidating the formations surrounding the wellbore during the drilling phase of the well, instead of performing separate sand control completion, such as gravel packing, frac-packing, or sand consolidation, at a later time. However, any fluid invasion or penetration into the formation of the production interval is considered to be negative for the potential production of the well and so drill-in fluids must be carefully designed.

SUMMARY OF THE INVENTION

The present invention relates to aqueous-based emulsified consolidating agents suitable for use during drill-in operations.

Some embodiments of the present invention provide methods of drilling a wellbore through a production zone within a subterranean formation comprising providing a drill-in fluid comprising an aqueous fluid, and a water-based consolidating emulsion wherein the water-based consolidating emulsion comprises an aqueous liquid, a hardenable resin, a hardening agent component and an emulsifying agent; and, using the drill-in fluid to drill at least a portion of a well bore into the production zone and allowing the water-based consolidating emulsion to penetrate into the walls of the well bore.

Other embodiments of the present invention provide methods of consolidating particulates surrounding a portion of a wellbore in a production zone within a subterranean formation comprising providing a production zone within a subterranean formation comprising unconsolidated or loosely consolidated particulates; providing a drill-in fluid comprising an aqueous fluid, and a water-based consolidating emulsion; wherein the water-based consolidating emulsion comprises an aqueous liquid, a hardenable resin, a hardening agent component and an emulsifying agent; and, using the drill-in fluid to drill at least a portion of a wellbore into the production zone; and, allowing the water-based consolidating emulsion to penetrate into the walls of the wellbore and to consolidate at least a portion of the unconsolidated or loosely consolidated particulates therein.

Still other embodiments of the present invention provide drill-in fluid for use in drilling through a producing zone in a subterranean formation comprising an aqueous fluid, and a water-based consolidating emulsion wherein the water-based consolidating emulsion comprises an aqueous liquid, a hardenable resin, a hardening agent component and an emulsifying agent.

The features and advantages of the present invention will be apparent to those skilled in the art. While numerous changes may be made by those skilled in the art, such changes are within the spirit of the invention.

DESCRIPTION OF PREFERRED EMBODIMENTS

Figure 1:
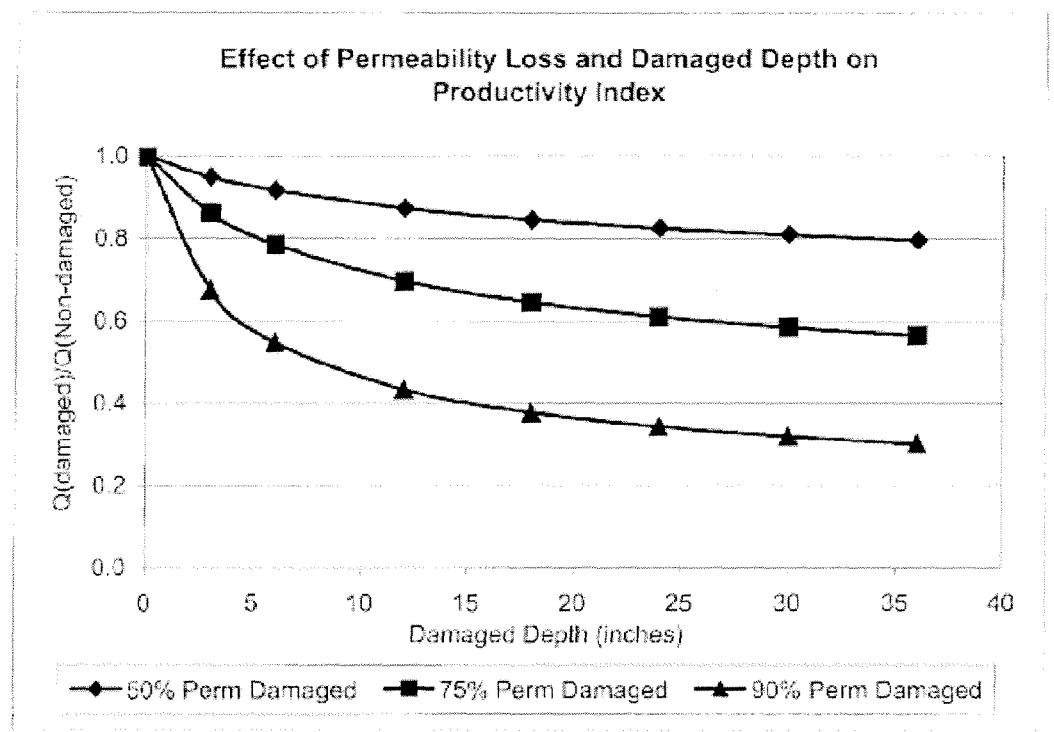
FIG. 1 illustrates the effects of permeability damaged on the productivity index caused by drill-in fluid comprising a consolidating agent, as a function of depth of penetration

The present invention relates to aqueous-based emulsified consolidating agents suitable for use during drill-in operations.

One of the many potential advantages of the aqueous-based emulsified consolidating agents in the present invention is that they may allow, among other things, for the consolidation of relatively unconsolidated portions of subterranean formations during a drill-in operation. In addition, use of the aqueous-based emulsified consolidating agents in the present invention may allow a relatively small amount of consolidating agent to be used and yet still result in the area surrounding the well bore achieving good strength performance and high regained permeability.

The methods of the present invention use water-based consolidating emulsions without the need for any solvents. The methods of the present invention generally comprise using a drill-in composition to drill at least a portion of a well bore and allowing the consolidating material in the drill-in composition to penetrate a depth into the wellbore walls to consolidate and stabilize the formation particulate surrounding the wellbore. The drill-in compositions suitable for use in the present invention comprise an aqueous fluid and a water-based consolidating emulsion.

In some embodiments, the water-based consolidating emulsion may make up at least about 0.1% w/v to about 25% w/v of the drill-in fluid; in still other embodiments the water-based consolidating emulsion may make up at least about 3% w/v to about 6% w/v of the drill-in fluid.

In some embodiments of the methods of the present invention, the drill-in fluids may further comprise one or more of a weighing agent; a viscosifying agent; a self degradable polymer particulate; and a hydratable gel particulate that may degrade into a liquid. In the methods of the present invention, the water-based consolidating emulsion comprises a hardenable resin component, a silane coupling agent, and a surfactant. In some embodiments, the drill-in fluid may further comprise a foaming agent and a gas; in embodiments wherein a foaming agent is used, the need for a fluid loss control agents, weighing agents, and/or viscosifying agents may be reduced or eliminated.

The drill-in fluids suitable for use in the present invention comprise an aqueous fluid and a water-based consolidating emulsion.

Suitable aqueous fluids that may be used in the drill-in fluids suitable for use in the present invention include fresh water, salt water, brine, seawater, or any other aqueous fluid that, preferably, does not adversely react with the other components used in accordance with this invention or with the subterranean formation. In some preferred embodiments, the aqueous fluid base comprises a brine. It has been found that some water-based consolidating emulsions may become unstable in the presence of salt, such as that found in a brine or in seawater. However, water-based consolidating emulsions suitable for use in the present invention have been found to remain stable over a period of months even in the presence of a 3% KCl brine. For example, when water-based consolidating emulsions were stored in final compositions of 3% KCl brine at room temperature (i.e., ~72° F.) in the laboratory for over nine months and then tested, it was found that they were able to provide good consolidation strengths. Similarly, when the water-based consolidating emulsions were stored in final compositions of 3% KCl brine at elevated temperatures (to simulate storage in a warehouse) for a period of about two months and then tested, it was found that they were able to provide good consolidation strengths. Thus, it may be desirable to choose a water-based consolidating emulsion as the preferred water-based consolidating emulsion when the selected aqueous fluid is salt water, a brine, seawater, or some other aqueous fluid comprising salts. Suitable aqueous fluids may contain salt concentrations, such as of KCl, range from 2% (w/v) to 7% (w/v) to, among other things, satisfy the ionic balance to control clay swelling and fines migration. It is within the ability of one skilled in the art with the benefit of this disclosure to determine if and how much salt may be desirable in the aqueous fluid bases used in the present invention.

Optionally, the drill-in fluids suitable for use in the present invention may comprise additional additives such as emulsion stabilizers, emulsion destabilizers, antifreeze agents, biocides, algaecides, pH control additives, oxygen scavengers, clay stabilizers, weighting agents, degradable fluid loss agents and the like or any other additive that does not adversely affect the drill-in fluid. For instance, an emulsion stabilizer may be beneficial when stability of the emulsion is desired for a lengthened period of time or at specified temperatures. In some embodiments, the emulsion stabilizer may be substantially any acid. In some embodiments, the emulsion stabilizer may be an organic acid, such as acetic acid. Additionally, antifreeze agents may be beneficial to lower the freezing point of the emulsion. In some embodiments, optional additives may be included in the drill-in fluids in an amount in the range of about 0.001% to about 10% by weight of the drill-in fluid composition. One of ordinary skill in the art with the benefit of this disclosure will recognize that the compatibility of any given additive should be tested to ensure that it does not adversely affect the performance of the consolidating agent emulsion.

In some embodiments, the drill-in fluid may further comprise a foaming agent. As used herein, the term "foamed" also refers to co-mingled fluids. In certain embodiments, it may desirable that the drill-in fluid, among other things, provide enhanced placement of a water-based consolidating emulsion and/or to reduce the amount of aqueous fluid that is required, e.g., in water sensitive subterranean formations. Various gases can be used for foaming the drill-in fluids of this invention, including, but not limited to, nitrogen, carbon dioxide, air, methane, and mixtures thereof. One of ordinary skill in the art with the benefit of this disclosure will be able to select an appropriate gas that may be used for foaming the drill-in fluids of the present invention. In some embodiments, the gas may be present in a drill-in fluid of the present invention in an amount in the range of about 5% to about 98% by volume of the drill-in fluid. In other embodiments, the gas may be present in a drill-in fluid of the present invention in an amount in the range of about 20% to about 80% by volume of the drill-in fluid. In some embodiments, the gas may be present in a drill-in fluid of the present invention in an amount in the range of about 30% to about 70% by volume of the drill-in fluid. The amount of gas to incorporate into the drill-in fluids may be affected by factors including the viscosity of the drill-in fluids and wellhead pressures involved in a particular application.

In those embodiments wherein it is desirable to foam the drill-in fluid used in the present invention, foaming agent surfactants, usually are nonionic surfactants, such as HY-CLEAN (HC-2)™ surface-active suspending agent, PEN-5™, or AQF-2™ additive, all of which are commercially available from Halliburton Energy Services, Inc., of Duncan, Okla., may be used. Additional examples of foaming agents that may be used to foam and stabilize the consolidating agent emulsions may include, but are not limited to, betaines, amine oxides, methyl ester sulfonates, alkylamidobetaines such as cocoamidopropyl betaine, alpha-olefin sulfonate, trimethyl-tallowammonium chloride, $C_8$ to $C_{22}$ alkylethoxylate sulfate and trimethylcocoammonium chloride. Other suitable foaming agents and foam stabilizing agents may be included as well, which will be known to those skilled in the art with the benefit of this disclosure. Examples of suitable foaming additives are available in U.S. Pat. Nos. 7,407,916, 7,287,594, 7,093,658, 7,124,822, 7,077,219, 7,040,419.

In some embodiments, the drill-in fluid used in the present invention may further comprise a weighting agent. Weighting agents are used to, among other things, increase the fluid density and thereby affect the hydrostatic pressure exerted by the fluid. Examples of suitable weighting agents include, but are not limited to, potassium chloride, sodium chloride, sodium bromide, calcium chloride, calcium bromide, ammonium chloride, zinc bromide, zinc formate, zinc oxide, and mixtures thereof.

In some embodiments, the drill-in fluids used in the present invention may further comprise a degradable fluid loss control agent. Degradable fluid loss control agents are used to, among other things, control leak off into a formation. Suitable degradable fluid loss control agents are generally degradable polymers including, but not limited to polysaccharides, chitins, chitosans, proteins, aliphatic polyesters, poly(lactides), poly(glycolides), poly(ε-carptolactones), poly(hydrooxybutyrates), poly(anhydrides), aliphatic polycarbonates, poly(orthoesters), poly(amino acids), poly(ethylene oxides), polyphoshazenes, and mixtures thereof. References include U.S. Pat. Nos. 7,281,583, 7,211,548, 7,096,947, 7,036,587. In other embodiments, the drill-in fluid may comprise degradable hydratable gel particulates that can be broken down with breakers or through a change in pH; suitable degradable hydratable gel particulates are described in U.S. Pat. No. 5,680,900.

Other additives may be suitable as well as might be recognized by one skilled in the art with the benefit of this disclosure Water-based consolidating emulsions suitable for use in the methods of the present invention comprise an aqueous liquid, a consolidating agent, and an emulsifying agent. In some embodiments, the water-based consolidating emulsions have an aqueous external phase and organic based internal phase. The term "emulsion" and any derivatives thereof as used herein refers to a mixture of two or more immiscible phases and includes, but is not limited to, dispersions and suspensions.

The water-based consolidating emulsions used in the present invention comprise an aqueous external phase comprising an aqueous liquid. Suitable aqueous liquids that may be used in the water-based consolidating emulsions of the present invention include fresh water, salt water, brine, seawater, or any other aqueous liquid that does not adversely react with the other components used in accordance with this invention or with the subterranean formation. In some embodiments, where long-term stability of the emulsion is desired, the preferred aqueous fluid may be one that is substantially free of salts. As used herein, "long term stability" refers to the ability of the emulsion to remain stable over a period of at least one month, preferably three or more months, and more preferably for about a year. As used here, the term "salts" is used in its ordinary meaning, referring to materials commonly used in the industry in the preparation of completion brines; and including materials such as potassium chloride, sodium chloride, ammonium chloride, and calcium chloride. It is within the ability of one skilled in the art with the benefit of this disclosure to determine if and how much salt may be tolerated in the consolidating agent emulsions of the present invention before it becomes problematic for the stability of the emulsion.

The aqueous liquid may be present in the water-based consolidating emulsions of the present invention in an amount in the range of about 20% to about 99.9% by weight of the water-based consolidating emulsions. In some embodiments, the aqueous liquid may be present in the water-based consolidating emulsion in an amount in the range of about 60% to about 99.9% by weight of the water-based consolidating emulsion. In other embodiments, the aqueous fluid may be present in the water-based consolidating emulsion in an amount in the range of about 95% to about 99.9% by weight of the water-based consolidating emulsion. The percentages given herein refer to the aqueous liquid as a percentage of the water-based consolidating emulsions, not as a percentage of the overall drill-in fluid. Other ranges may be suitable as well, depending on the other components of the water-based consolidating emulsion.

The consolidating agents may be present in the water-based consolidating emulsion of the present invention in an amount in the range of about 0.1% to about 80% by weight of the water-based consolidating emulsion. In some embodiments, the consolidating agent may be present in the water-based consolidating emulsion used in the methods of the present invention in an amount in the range of about 0.1% to about 40% by weight of the water-based consolidating emulsion. In some embodiments, the consolidating agent may be present in the water-based consolidating emulsions water-based consolidating emulsion in an amount in the range of about 0.1% to about 5% by weight of the water-based consolidating emulsion. These percentages refer to the aqueous liquid as a percentage of the water-based consolidating emulsions, not as a percentage of the overall drill-in fluid. The amount of consolidating agent included in a particular water-based consolidating emulsion to be used in a particular drill-in fluid may depend upon, among other factors, the composition and/or temperature of the subterranean formation, the chemical composition of formations fluids, flow rate of fluids present in the formation, the effective porosity and/or permeability of the subterranean formation, pore throat size and distribution, and the like. Furthermore, the concentration of the consolidating agent can be varied to either enhance bridging and thus provide for a more rapid coating of the consolidating agent or to minimize bridging and thus allow deeper penetration into the subterranean formation. It is within the ability of one skilled in the art, with the benefit of this disclosure, to determine the amount of consolidating agent to include in the consolidating agent emulsions of the present invention to achieve the desired results.

The consolidating agents suitable for use in the water-based consolidating emulsions used in the present invention comprise a two-component epoxy based resin comprising (1) a liquid hardenable resin and (2) a liquid hardening agent component. Solvents are not required for use in the consolidating agents used in the present invention.

The liquid hardenable resins suitable for use in the present invention include, but are not limited to, organic resins such as bisphenol A diglycidyl ether resins, butoxymethyl butyl glycidyl ether resins, bisphenol A-epichlorohydrin resins, bisphenol F resins, polyepoxide resins, novolak resins, polyester resins, phenol-aldehyde resins, urea-aldehyde resins, furfuryl alcohol, furan resins, urethane resins, glycidyl ether resins, other epoxide resins and combinations thereof. In some embodiments, the hardenable resin may comprise a urethane resin. Examples of suitable urethane resins may comprise a polyisocyanate component and a polyhydroxy component. Examples of suitable hardenable resins, including urethane resins, which may be suitable for use in the methods of the present invention, include those described in U.S. Pat. Nos. 6,582,819; 4,585,064; 6,677,426; and 7,153,575; the relevant disclosures of which are herein incorporated by reference.

The second component used in suitable consolidating agents is a liquid hardening agent component, which is comprised of a hardening agent and a surfactant. In some embodiments, the hardening agent component may further comprise a silane coupling agent.

Examples of the hardening agents that can be used in the liquid hardening agent component include, but are not limited to, cyclo-aliphatic amines, such as piperazine, derivatives of piperazine (e.g., aminoethylpiperazine) and modified piperazines; aromatic amines, such as methylene dianiline, derivatives of methylene dianiline and hydrogenated forms, and 4,4'-diaminodiphenyl sulfone; aliphatic amines, such as ethylene diamine, diethylene triamine, triethylene tetraamine, and tetraethylene pentamine; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3,5-triazine; thiazole; pteridine; indazole; amines; polyamines; amides; polyamides; 2-ethyl-4-methyl imidazole; and combinations thereof. The chosen hardening agent often effects the range of temperatures over which a hardenable resin is able to cure. By way of example and not of limitation, in subterranean formations having a temperature of about 60° F. to about 250° F., amines and cyclo-aliphatic amines such as piperidine, triethylamine, tris(dimethylaminomethyl)phenol, and dimethylaminomethyl)phenol may be preferred. In subterranean formations having higher temperatures, 4,4'-diaminodiphenyl sulfone may be a suitable hardening agent. Hardening agents that comprise piperazine or a derivative of piperazine have been shown capable of curing various hardenable resins from temperatures as low as about 50° F. to as high as about 350° F.

The hardening agent used may be included in the liquid hardening agent component in an amount sufficient to at least partially harden the resin composition. In some embodiments of the present invention, the hardening agent used is included in the liquid hardening agent component in the range of about 0.1% to about 95% by weight of the liquid hardening agent component. In other embodiments, the hardening agent used may be included in the liquid hardening agent component in an amount of about 15% to about 85% by weight of the liquid hardening agent component. In other embodiments, the hardening agent used may be included in the liquid hardening agent component in an amount of about 15% to about 55% by weight of the liquid hardening agent component.

Any surfactant compatible with the hardening agent and capable of facilitating the coating of the resin onto particulates in the subterranean formation may be used in the liquid hardening agent component. Such surfactants include, but are not limited to, an alkyl phosphonate surfactant (e.g., a $C_{12}$-$C_{22}$ alkyl phosphonate surfactant), an ethoxylated nonyl phenol phosphate ester, one or more cationic surfactants, and one or more nonionic surfactants. Mixtures of one or more cationic and nonionic surfactants also may be suitable. Examples of such surfactant mixtures are described in U.S. Pat. No. 6,311,773, the relevant disclosure of which is incorporated herein by reference. The surfactant or surfactants that may be used are included in the liquid hardening agent component in an amount in the range of about 1% to about 10% by weight of the liquid hardening agent component.

The optional silane coupling agent may be used, among other things, to act as a mediator to help bond the resin to formation particulates. The term "silane coupling agent" as used herein refers to a compound with have at least two reactive groups of different types bonded to a silicon atom. One of the reactive groups of different types is reactive with various inorganic materials such as glass, metals, silica sand and the like and may form a chemical bond with the surface of such inorganic materials; while the other of the reactive group is reactive with various kinds of organic materials and may form a chemical bond with the surface of such organic materials. As a result, silane coupling agents are capable of providing chemical bonding between an organic material and an inorganic material.

While any silane coupling agent may be used, examples of silane coupling agents include, N-2-(aminoethyl)-3-aminopropyltrimethoxysilane; 3-glycidoxypropyltrimethoxysilane; gamma-aminopropyltriethoxysilane; N-beta-(aminoethyl)-gamma-aminopropyltrimethoxysilanes, aminoethyl-N-beta-(aminoethyl)-gamma-aminopropyl-trimethoxysilanes; gamma-ureidopropyl-triethoxysilanes; beta-(3-4 epoxy-cyclohexyl)-ethyl-trimethoxysilane; and gamma-glycidoxypropyltrimethoxysilanes; vinyltrichlorosilane; vinyltris (beta-methoxyethoxy) silane; vinyltriethoxysilane; vinyltrimethoxysilane; 3-metacryloxypropyltrimethoxysilane; beta-(3,4 epoxycyclohexyl)-ethyltrimethoxysilane; r-glycidoxypropyltrimethoxysilane; r-glycidoxypropylmethyldiethoxysilane; N-beta (aminoethyl)-r-aminopropyl-trimethoxysilane; N-beta (aminoethyl)-r-aminopropylmethyldimethoxysilane; 3-aminopropyl-triethoxysilane; N-phenyl-r-aminopropyltrimethoxysilane; r-mercaptopropyltrimethoxysilane; r-chloropropyltrimethoxysilane; Vinyltrichlorosilane; Vinyltris (beta-methoxyethoxy) silane; Vinyltrimethoxysilane; r-metacryloxypropyltrimethoxysilane; beta-(3,4 epoxycyclohexyl)-ethyltrimethoxysilane; r-glycidoxypropyltrimethoxysilane; r-glycidoxypropylmethylidiethoxysilane; N-beta (aminoethyl)-r-aminopropyltrimethoxysilane; N-beta (aminoethyl)-r-aminopropylmethyldimethoxysilane; r-aminopropyltriethoxysilane; N-phenyl-r-aminopropyltrimethoxysilane; r-mercaptopropyltrimethoxysilane; r-chloropropyltrimethoxysilane and combinations thereof.

The silane coupling agent may be included in the liquid hardening agent component in an amount capable of sufficiently bonding the resin to the particulate. In some embodiments of the present invention, the silane coupling agent used is included in the liquid hardening agent component in the range of about 0.1% to about 3% by weight of the liquid hardening agent component.

The water-based consolidating emulsions used in the present invention comprise an aqueous liquid, a consolidating agent (itself comprising a liquid hardenable resin and a liquid hardening agent component), and an emulsifying agent. The emulsion may be formed in a number of ways. In some embodiments, the water-based consolidating emulsion is formed when the liquid hardenable resin emulsified in the liquid hardening agent component, and wherein the liquid hardenable resin is the internal phase of the emulsion and the liquid hardening agent component is the external phase of the emulsion. In other embodiments, the liquid hardenable resin may be emulsified in the aqueous liquid; in such embodiments, the liquid hardening agent component may be present in the aqueous fluid of the drill-in composition or may be provided separately. In still other embodiments, both the liquid hardenable resin and the liquid hardening agent component may both be emulsified into the aqueous liquid.

Examples of suitable emulsifying agents may include surfactants, proteins, hydrolyzed proteins, lipids, glycolipids, and nanosized particulates, including, but not limited to fumed silica. One skilled in the art will be capable of choosing a suitable emulsifying agent or agents based on the desired final stability of the emulsion, the other starting materials, and the form of the emulsion.

Surfactants suitable for use as an emulsifying agent in the present invention are those capable of emulsifying an organic based component in an aqueous based component so that the emulsion has an aqueous external phase and an organic internal phase. In some embodiments, the surfactant may comprise an amine surfactant. Such preferred amine surfactants include, but are not limited to, amine ethoxylates and amine ethoxylated quaternary salts such as tallow diamine and tallow triamine ethoxylates and quaternary salts. Examples of suitable surfactants are ethoxylated $C_{12}$-$C_{22}$ diamine, ethoxylated $C_{12}$-$C_{22}$ triamine, ethoxylated $C_{12}$-$C_{22}$ tetraamine, ethoxylated $C_{12}$-$C_{22}$ diamine methylchloride quat, ethoxylated $C_{12}$-$C_{22}$ triamine methylchloride quat, ethoxylated $C_{12}$-$C_{22}$ tetraamine methylchloride quat, ethoxylated $C_{12}$-$C_{22}$ diamine reacted with sodium chloroacetate, ethoxylated $C_{12}$-$C_{22}$ triamine reacted with sodium chloroacetate, ethoxylated $C_{12}$-$C_{22}$ tetraamine reacted with sodium chloroacetate, ethoxylated $C_{12}$-$C_{22}$ diamine acetate salt, ethoxylated $C_{12}$-$C_{22}$ diamine hydrochloric acid salt, ethoxylated $C_{12}$-$C_{22}$ diamine glycolic acid salt, ethoxylated $C_{12}$-$C_{22}$ diamine DDBSA salt, ethoxylated $C_{12}$-$C_{22}$ triamine acetate salt, ethoxylated $C_{12}$-$C_{22}$ triamine hydrochloric acid salt, ethoxylated $C_{12}$-$C_{22}$ triamine glycolic acid salt, ethoxylated $C_{12}$-$C_{22}$ triamine DDBSA salt, ethoxylated $C_{12}$-$C_{22}$ tetraamine acetate salt, ethoxylated $C_{12}$-$C_{22}$ tetraamine hydrochloric acid salt, ethoxylated $C_{12}$-$C_{22}$ tetraamine glycolic acid salt, ethoxylated $C_{12}$-$C_{22}$ tetraamine DDBSA salt, pentamethylated $C_{12}$-$C_{22}$ diamine quat, heptamethylated $C_{12}$-$C_{22}$ diamine quat, nonamethylated $C_{12}$-$C_{22}$ diamine quat, and combinations thereof.

One example of a commercially available amine surfactant is TER 2168 Series available from Champion Chemicals located in Fresno, Tex. Other commercially available examples include ETHOMEEN T/12, a diethoxylated tallow amine; ETHOMEEN S/12, a diethoxylated soya amine; DUOMEEN O, a N-oleyl-1,3-diaminopropane; DUOMEEN T, a N-tallow-1,3-diaminopropane; all of which are commercially available from Akzo Nobel.

In other embodiments, the surfactant may be a tertiary alkyl amine ethoxylate (a cationic surfactant). TRITON RW-100 surfactant and TRITON RW-150 surfactant are examples of tertiary alkyl amine ethoxylates that are commercially available from Dow Chemical Company.

In other embodiments, the surfactant may be a combination of an amphoteric surfactant and an anionic surfactant. In some embodiments, the relative amounts of the amphoteric surfactant and the anionic surfactant in the surfactant mixture may be of about 30% to about 45% by weight of the surfactant mixture and of about 55% to about 70% by weight of the surfactant mixture, respectively. The amphoteric surfactant may be lauryl amine oxide, a mixture of lauryl amine oxide and myristyl amine oxide (i.e., a lauryl/myristyl amine oxide), cocoamine oxide, lauryl betaine, oleyl betaine, or combinations thereof, with the lauryl/myristyl amine oxide being preferred. The cationic surfactant may be cocoalkyltriethyl ammonium chloride, hexadecyltrimethyl ammonium chloride, or combinations thereof, with a 50/50 mixture by weight of the cocoalkyltriethyl ammonium chloride and the hexadecyltrimethyl ammonium chloride being preferred.

In other embodiments, the surfactant may be a nonionic surfactant. Examples of suitable nonionic surfactants include, but are not limited to, alcohol oxylalkylates, alkyl phenol oxylalkylates, nonionic esters, such as sorbitan esters, and alkoxylates of sorbitan esters. Examples of suitable surfactants include, but are not limited to, castor oil alkoxylates, fatty acid alkoxylates, lauryl alcohol alkoxylates, nonylphenol alkoxylates, octylphenol alkoxylates, tridecyl alcohol alkoxylates, such as polyoxyethylene ("POE")-10 nonylphenol ethoxylate, POE-100 nonylphenol ethoxylate, POE-12 nonylphenol ethoxylate, POE-12 octylphenol ethoxylate, POE-12 tridecyl alcohol ethoxylate, POE-14 nonylphenol ethoxylate, POE-15 nonylphenol ethoxylate, POE-18 tridecyl alcohol ethoxylate, POE-20 nonylphenol ethoxylate, POE-20 oleyl alcohol ethoxylate, POE-20 stearic acid ethoxylate, POE-3 tridecyl alcohol ethoxylate, POE-30 nonylphenol ethoxylate, POE-30 octylphenol ethoxylate, POE-34 nonylphenol ethoxylate, POE-4 nonylphenol ethoxylate, POE-40 castor oil ethoxylate, POE-40 nonylphenol ethoxylate, POE-40 octylphenol ethoxylate, POE-50 nonylphenol ethoxylate, POE-50 tridecyl alcohol ethoxylate, POE-6 nonylphenol ethoxylate, POE-6 tridecyl alcohol ethoxylate, POE-8 nonylphenol ethoxylate, POE-9 octylphenol ethoxylate, mannide monooleate, sorbitan isostearate, sorbitan laurate, sorbitan monoisostearate, sorbitan monolaurate, sorbitan monooleate, sorbitan monopalmitate, sorbitan monostearate, sorbitan oleate, sorbitan palmitate, sorbitan sesquioleate, sorbitan stearate, sorbitan trioleate, sorbitan tristearate, POE-20 sorbitan monoisostearate ethoxylate, POE-20 sorbitan monolaurate ethoxylate, POE-20 sorbitan monooleate ethoxylate, POE-20 sorbitan monopalmitate ethoxylate, POE-20 sorbitan monostearate ethoxylate, POE-20 sorbitan trioleate ethoxylate, POE-20 sorbitan tristearate ethoxylate, POE-30 sorbitan tetraoleate ethoxylate, POE-40 sorbitan tetraoleate ethoxylate, POE-6 sorbitan hexastearate ethoxylate, POE-6 sorbitan monostearate ethoxylate, POE-6 sorbitan tetraoleate ethoxylate, and/or POE-60 sorbitan tetrastearate ethoxylate. Preferred nonionic surfactants include alcohol oxyalkyalates such as POE-23 lauryl alcohol and alkyl phenol ethoxylates such as POE (20) nonyl phenyl ether.

While cationic, amphoteric, and nonionic surfactants are preferred, any suitable emulsifying surfactant may be used. Good surfactants for emulsification typically need to be either ionic, to give charge stabilization, to have a sufficient hydrocarbon chain length or cause a tighter packing of the hydrophobic groups at the oil/water interface to increase the stability of the emulsion. One of ordinary skill in the art with the benefit of this disclosure will be able to select a suitable surfactant depending upon the consolidating agent that is being emulsified. Additional suitable surfactants may include other cationic surfactants and even anionic surfactants. Examples include, but are not limited to, hexahydro-1 3,5-tris (2-hydroxyethyl) triazine, alkyl ether phosphate, ammonium lauryl sulfate, ammonium nonylphenol ethoxylate sulfate, branched isopropyl amine dodecylbenzene sulfonate, branched sodium dodecylbenzene sulfonate, dodecylbenzene sulfonic acid, branched dodecylbenzene sulfonic acid, fatty acid sulfonate potassium salt, phosphate esters, POE-1 ammonium lauryl ether sulfate, POE-1 sodium lauryl ether sulfate, POE-10 nonylphenol ethoxylate phosphate ester, POE-12 ammonium lauryl ether sulfate, POE-12 linear phosphate ester, POE-12 sodium lauryl ether sulfate, POE-12 tridecyl alcohol phosphate ester, POE-2 ammonium lauryl ether sulfate, POE-2 sodium lauryl ether sulfate, POE-3 ammonium lauryl ether sulfate, POE-3 disodium alkyl ether sulfosuccinate, POE-3 linear phosphate ester, POE-3 sodium lauryl ether sulfate, POE-3 sodium octylphenol ethoxylate sulfate, POE-3 sodium tridecyl ether sulfate, POE-3 tridecyl alcohol phosphate ester, POE-30 ammonium lauryl ether sulfate, POE-30 sodium lauryl ether sulfate, POE-4 ammonium lauryl ether sulfate, POE-4 ammonium nonylphenol ethoxylate sulfate, POE-4 nonyl phenol ether sulfate, POE-4 nonylphenol ethoxylate phosphate ester, POE-4 sodium lauryl ether sulfate, POE-4 sodium nonylphenol ethoxylate sulfate, POE-4 sodium tridecyl ether sulfate, POE-50 sodium lauryl ether sulfate, POE-6 disodium alkyl ether sulfosuccinate, POE-6 nonylphenol ethoxylate phosphate ester, POE-6 tridecyl alcohol phosphate ester, POE-7 linear phosphate ester, POE-8 nonylphenol ethoxylate phosphate ester, potassium dodecylbenzene sulfonate, sodium 2-ethyl hexyl sulfate, sodium alkyl ether sulfate, sodium alkyl sulfate, sodium alpha olefin sulfonate, sodium decyl sulfate, sodium dodecylbenzene sulfonate, sodium lauryl sulfate, sodium lauryl sulfoacetate, sodium nonylphenol ethoxylate sulfate, and/or sodium octyl sulfate.

Other suitable emulsifying agents are described in U.S. Pat. Nos. 6,653,436 and 6,956,086, the relevant disclosures of which are herein incorporated by reference.

In some embodiments, the emulsifying agent may function in more than one capacity. For example, in some embodiments, a suitable emulsifying agent may also be a hardening agent. Examples of suitable emulsifying agents that may also function as a hardening agent include, but are not limited to, those described in U.S. Pat. No. 5,874,490, the relevant disclosure of which is herein incorporated by reference.

In some embodiments, the emulsifying agent may be present in the water-based consolidating emulsions in an amount in the range of about 0.001% to about 10% by weight of the water-based consolidating emulsions. In some embodiments, the emulsifying agent may be present in the consolidating agent emulsion in an amount in the range of about 0.05% to about 5% by weight of the water-based consolidating emulsions. In another embodiment, both liquid hardenable resin component and liquid hardening agent component are separately captured in the internal phase of the emulsions and then mixed into an aqueous fluid to form the drill-in fluid.

Water-based consolidating emulsions suitable for us in the present invention can be formed in many ways. In some embodiments, the water-based consolidating emulsion comprises combining an aqueous liquid comprising a liquid hardening agent with an emulsion having an aqueous external phase and a hardenable resin internal phase. In other embodiments the water-based consolidating emulsion comprises combining an aqueous liquid, a first emulsion having a hardenable resin internal phase and an aqueous external phase, and a second emulsion having a liquid hardening agent internal phase and an aqueous external phase.

One benefit of the water-based consolidating emulsions of the present invention is that they allow for preparation of the consolidating treatment fluid that may be completed in advance of when it will be needed at the well site. In this way, the consolidating emulsions may be formed off-site and then mixed with a drill-in fluid at or near the time and site of use.

The drill-in fluids suitable for use in the present invention may be used to drill into any portion of a subterranean formation but are best suited for use in producing zones along a wellbore. Generally, the drill-in fluids are used in place of a drilling mud in a producing portion of a subterranean formation to allow for successful drilling, removal of drill cuttings, and consolidating of the portion of the formation surrounding the wellbore.

One embodiment of the present invention describes a method of drilling a wellbore through a production zone within a subterranean formation comprising providing a drill-in fluid comprising a water-based consolidating emulsion, and using the drill-in fluid to drill at least a portion of a well bore into the production zone and allowing the water-based consolidating emulsion to penetrate into the walls of the well bore. In some embodiments, the drill-in fluid may be a foamed fluid.

Another embodiment of the present invention describes a method of consolidating particulates in surrounding a portion of a wellbore in a production zone within a subterranean formation comprising providing a production zone within a subterranean formation comprising unconsolidated or loosely consolidated particulates; providing a drill-in fluid comprising an aqueous fluid and a water-based consolidating emulsion; using the drill-in fluid to drill at least a portion of a well bore into the production zone; and, allowing the water-based consolidating emulsion to penetrate into the walls of the wellbore and to consolidate at least a portion of the unconsolidated or loosely consolidated particulates therein.

The depth of penetration of fluid loss into the formation wall is controlled by permeability of the formation matrix, delta pressure between the wellbore pressure and the reservoir pressure, amount or concentration of fluid loss control agents and their particle size distribution, amount or concentration of consolidating agent emulsions and their particle size distribution, amount or concentration of solid particulates or drill cuttings and their size distribution existing in the drill-in fluid. For the case of using foamed drill-in fluid, the foam quality (i.e., percent of liquid has been transformed into foam) and particle size of generated foam also contribute to the depth of penetration of fluid loss into the formation in addition to permeability of the formation matrix, delta pressure between the wellbore pressure and the reservoir pressure.

EXAMPLES

FIG. 1 illustrates the effects of permeability damaged on the productivity index caused by drill-in fluid, in this case consolidating agent, as a function of depth of penetration. This Pressure-Transient analysis shows that if the damage caused by the consolidating agent is less than 75% and its depth of penetration into the formation is less than 5 inches, application of consolidating wellbore while drilling in the production interval is a viable method because this method still retains more than 80% of the potential production of the interval.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "of about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A method of drilling a wellbore through a production zone within a subterranean formation comprising:
   providing a drill-in fluid comprising a water-based consolidating emulsion wherein the water-based consolidating emulsion comprises an aqueous liquid and an emulsion comprising a hardening agent external phase and hardenable resin internal phase;
   using the drill-in fluid comprising a water-based consolidating emulsion to drill at least a portion of a wellbore into the production zone; and,
   allowing the water-based consolidating emulsion to penetrate into the walls of the wellbore.

2. The method of claim 1 wherein the drill-in fluid comprises from about 0.1-% w/v to about 25% w/v of the water-based consolidating emulsion.

3. The method of claim 1 wherein the drill-in fluid comprises at least one additive selected from the group consisting of weighing agents; viscosifying agents; self-degradable polymer particulates; and hydratable gel particulates.

4. The method of claim 1 wherein the drill-in fluid is a foamed fluid comprising at least one surfactant selected from the group consisting of betaines, amine oxides, methyl ester sulfonates, and alkylamidobetaines.

5. The method of claim 1 wherein the water-based consolidating emulsion comprises at least one hardenable resin selected from the group consisting of organic resins.

6. The method of claim 1 wherein the hardening agent component comprises a hardening agent and a surfactant.

7. The method of claim 6 wherein the hardening agent comprises a hardening agent selected from the group consisting of cyclo-aliphatic amines, aliphatic amines, imidazole; pyrazole; pyrazine; pyrimidine; pyridazine; 1H-indazole, purine; phthalazine; naphthyridine; quinoxaline; quinazoline; phenazine; imidazolidine; cinnoline; imidazoline; 1,3, 5-triazine; thiazole; pteridine; indazole; amines; polyamines; amides; polyamides; and 2-ethyl-4-methyl imidazole.

8. The method of claim 6 wherein the hardening agent component further comprises a silane coupling agent.

9. The method of claim 1 further comprising an emulsifying agent wherein the emulsifying agent is present in the water-based consolidating emulsion in an amount of less than about 10% by weight of the water-based consolidating emulsion.

10. A method of drilling through a production zone within a subterranean formation comprising:
    providing a drill-in fluid comprising a water-based consolidation emulsion wherein the water-based consolidating emulsion comprises an aqueous liquid, a first emulsion comprising a hardenable resin internal phase and an aqueous external phase, and a second emulsion comprising a hardening agent internal phase and an aqueous external phase;
    using the drill-in fluid comprising a water-based consolidating emulsion to drill at least a portion of a wellbore into the production zone; and,
    allowing the water-based consolidating emulsion to penetrate into the walls of the wellbore.

11. The method of claim 10 wherein the drill-in fluid comprises from about 0.1% w/v to about 25% w/v of the water-based consolidating emulsion.

12. The method of claim 10 wherein the drill-in fluid comprises at least one additive selected from the group consisting of weighing agents; viscosifying agents; self-degradable polymer particulates; and hydratable gel particulates.

13. The method of claim 10 wherein the drill-in fluid is a foamed fluid comprising at least one surfactant selected from the group consisting of betaines; amine oxides; methyl ester sulfonates; and alkylamidobetaines.

14. The method of claim 10 wherein the water-based consolidating emulsion comprises at least one hardenable resin selected from the group consisting of organic resins.

15. The method of claim 10 wherein the hardening agent component comprises a hardening agent and a surfactant.

16. The method of claim 15 wherein the hardening agent comprises a hardening agent selected from the group consisting of cyclo-aliphatic amines; aliphatic amines; imidazole; pyrazole; pyrazine; pyrimidine; pyridazine; 1H-indazole; purine; phthalazine; naphthyridine; quinoxaline; quinazoline; phenazine; imidazolidine; cinnoline; imidazoline; 1,3, 5-triazine; thiazole; pteridine; indazole; amines; polyamines; amides; polyamides; and 2-ethyl-4-methyl imidazole.

17. The method of claim 15 wherein the hardening agent component further comprises a silane coupling agent.

18. The method of claim 10 further comprising an emulsifying agent wherein the emulsifying agent is present in the water-based consolidating emulsion in an amount of less than about 10% by weight of the water-based consolidating emulsion.

* * * * *